US010083678B1

(12) United States Patent
Little et al.

(10) Patent No.: US 10,083,678 B1
(45) Date of Patent: Sep. 25, 2018

(54) ENHANCED USER INTERFACES FOR VIRTUAL INSTRUMENTS

(71) Applicant: Apple Inc., Cupertino, CA (US)

(72) Inventors: Alec H. Little, Woodside, CA (US); Eli T. Manjarrez, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/719,237

(22) Filed: Sep. 28, 2017

(51) Int. Cl.
- *A63H 5/00* (2006.01)
- *G04B 13/00* (2006.01)
- *G10H 1/00* (2006.01)
- *G06F 3/0488* (2013.01)
- *G10H 1/32* (2006.01)
- *G06F 3/0482* (2013.01)
- *G06F 3/0481* (2013.01)

(52) U.S. Cl.
CPC ....... *G10H 1/0008* (2013.01); *G06F 3/04883* (2013.01); *G10H 1/32* (2013.01); *G06F 3/0482* (2013.01); *G06F 3/04817* (2013.01); *G10H 2210/555* (2013.01); *G10H 2220/096* (2013.01); *G10H 2220/165* (2013.01)

(58) Field of Classification Search
CPC ....... G10H 2220/096; G10H 2230/015; G10H 2220/241; G10H 1/38; G10H 1/0008; G10H 1/32; G10H 2210/555; G10H 2220/165; G06F 3/04883; G06F 3/0482

USPC .......................................................... 84/609
See application file for complete search history.

(56) References Cited

U.S. PATENT DOCUMENTS

| 8,835,738 B2 * | 9/2014 | Little | G10H 1/38 |
| | | | 84/613 |
| 9,111,518 B2 * | 8/2015 | Little | G10H 1/38 |
| 2011/0146477 A1 * | 6/2011 | Tsukamoto | G09B 15/003 |
| | | | 84/485 R |
| 2013/0180385 A1 * | 7/2013 | Hamilton | G10H 1/0016 |
| | | | 84/603 |

\* cited by examiner

*Primary Examiner* — Jeffrey Donels
(74) *Attorney, Agent, or Firm* — Kilpatrick Townsend & Stockton LLP

(57) ABSTRACT

Embodiments of the present disclosure can provide systems, methods, and computer-readable medium for implementing user interfaces and user interface elements for interacting with a virtual instrument. For example, a user interface for a virtual instrument may be presented on a display of a device. The user interface may have any suitable number of strings having a first spacing. Each string may correspond to an associated audio file. User mode input may be received at the user interface. In response to receiving the user mode input, a user interface element (e.g., a corresponding enhanced selection area) may be presented. The presented user interface element may include a subset of the plurality of strings and may have a second spacing that is greater than the first spacing. By utilizing the user interface element, a user is enabled to make more accurate input than conventional techniques allow.

20 Claims, 11 Drawing Sheets

ENHANCED USER INTERFACES FOR VIRTUAL INSTRUMENTS

BACKGROUND

Virtual musical instruments, such as musical instrument digital interface (MIDI)-based or software-based keyboards, string instruments, and the like, typically have user interfaces that attempt to closely resemble the actual instrument. When a user selects an element of the user interface, the virtual musical instrument attempts to play a note. While these instruments are enjoyable to amateur and experienced musicians alike, they can be difficult to play when the virtual musical instrument has many possible inputs (e.g., keys, strings, etc.). For example, a harp instrument has 47 strings. If the virtual musical instrument is provided in a configuration that closely resembles the actual instrument, all 47 strings would be displayed as input options. In some cases, this can make the selection of any one string (or a combination of strings) cumbersome. Additionally, stylistic features may be difficult or impossible for a user to emulate with conventional user interfaces. This can be problematic for users who would like to include such stylistic features as they play.

SUMMARY

Embodiments of the present disclosure can provide systems, methods, and computer-readable medium for implementing enhanced user interfaces for interacting with a virtual instrument. In some examples, a computing device (e.g., a mobile phone, a tablet, or other portable, handheld device) may be used to present enhanced user interface elements to provide the user with more accurately selectable input options during audio output.

In some embodiments, a computer-implemented method for providing an enhanced view of a virtual instrument is disclosed. The method may include presenting, on a display of a device, a user interface for a virtual instrument having a plurality of strings having a first spacing. In some embodiments, each string may be capable of voicing at least one associated audio file in response to a user input. The method may further include receiving a user mode input at the user interface of the virtual instrument. In response to the user mode input, a user interface element corresponding to an enhanced view of the virtual instrument may be provided. The enhanced view may include a subset of the plurality of strings. In some embodiments, the subset of the plurality of strings may have a second spacing that is greater than the first spacing.

In some embodiments, a device may be provided. The device may include a memory configured to store computer-executable instructions, a display, a speaker, and a processor in communication with the memory, the display, and the speaker. The processor may be configured to execute the computer-executable instructions. Executing the instructions may cause the device to present, on the display, a user interface for a virtual instrument having a plurality of strings having a first spacing. Each string may be capable of voicing at least one associated audio file in response to a user input. Executing the instructions may further cause the device to receive a user mode input at the user interface of the virtual instrument. In response to the user mode input, a user interface element corresponding to an enhanced view of the virtual instrument may be presented. The enhanced view may include a subset of the plurality of strings having a second spacing that is greater than the first spacing. Executing the instructions may further cause the device to receive, at the user interface element, input corresponding to a location within the user interface element. The location may correspond to a string of the plurality of strings presented in the user interface element. Executing the instructions may further cause the device to present, via the speaker, the at least one associated audio file according to the input. In some embodiments, the at least one associated audio file may be associated with the location within the user interface element In some embodiments, a computer-readable medium may be provided. The computer-readable medium may store thereon computer-executable instructions that, when executed by a processor, cause the processor to perform operations. The operations may include presenting, on a display of a device, a user interface for a virtual instrument having a plurality of strings having a first spacing. In some embodiments, each string may be capable of voicing at least one associated audio file in response to a user input. The operations may further include receiving a user mode input at the user interface of the virtual instrument. In response to the user mode input, a user interface element corresponding to an enhanced view of the virtual instrument may be provided. The enhanced view may include a subset of the plurality of strings. In some embodiments, the subset of the plurality of strings may have a second spacing that is greater than the first spacing.

The following detailed description together with the accompanying drawings will provide a better understanding of the nature and advantages of the present disclosure.

DETAILED DESCRIPTION

Figure 1:
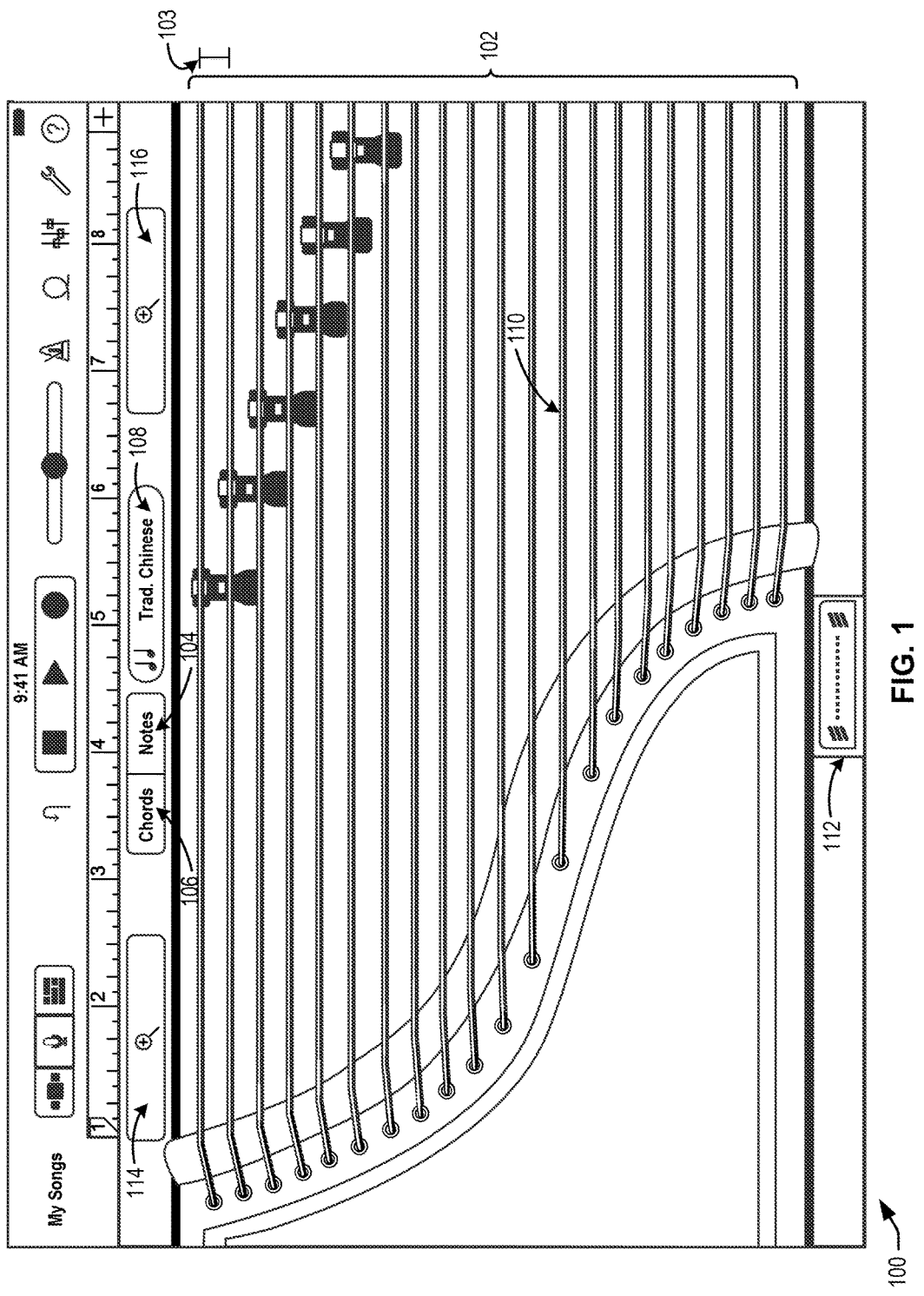
FIG. 1 is a simplified block diagram illustrating an example user interface for a virtual instrument (e.g., a Guzheng) that includes a variety of user interface elements, according to at least one embodiment.

Certain embodiments of the present disclosure relate to devices, computer-readable medium, user interfaces, and methods for implementing user interfaces and user interface elements for interacting with a virtual instrument. Examples are described with reference to virtual instruments, and user interfaces of the virtual instruments for playing notes and/or music (e.g., electronic audio files) with the virtual instruments. The virtual instruments may be generally designed to give the look and feel of an actual instrument, and may be intended to sound like the actual instrument. Virtual instruments can be designed to mimic nearly any musical instrument, with examples including, but not limited to, string instruments, brass/horns, woodwinds, various keyboards, and the like. Although examples herein may utilize particular stringed instruments, the same examples may be similarly applied to other types of musical instruments. Thus, any reference to a "string" may similarly be applied to a "key" of another type of instrument. A computing device (e.g., a mobile phone, tablet, or other portable, handheld device, or a desktop computer, laptop, etc.) may be configured to present various user interfaces and corresponding user interface elements that enable enhanced user input capabilities.

By way of example, the computing device may provide a user interface that may include a visual representation of a variety of strings that correspond to notes that may be sounded by the actual instrument. As a non-limiting example, the computing device may be configured to present a user interface that closely resembles a string instrument. For example, many string instruments (e.g., a Guzheng, a Koto, a harp, etc.) are associated with a relatively large number of strings. A harp may have 47 strings, for example. A Guzheng is a traditional Chinese instrument that is 64 inches long and has a large, resonant cavity made from wood. The Guzheng may have 16 or more (e.g., 21) strings. A Koto is a traditional Japanese strings instrument that is derived from the Chinese Guzheng, which may have 13 (or 17) strings. The user interface may be presented on a display of the computing device to enable the user to select one or more strings for which audio output is presented (e.g., via a speaker of the device). The strings provided at the user interface may be spaced according to, for example, display capabilities of the device (e.g., a display size, shape, resolution, etc.). Accordingly, strings displayed on a device with a larger screen size (e.g., a tablet, a laptop, etc.) may be configured to display the strings at a wider spacing than spacing provided on a device (e.g., a smartphone) with a smaller screen size.

In some embodiments, a user interface may include a number of user interface elements (referred to herein as "enhanced selection areas") that provide an enhanced view of the user interface. By way of example, the user may select an option (e.g., a button featuring a magnifying glass icon with a plus sign) at the user interface. Upon selection, the user may be presented with an enhanced view of the user interface via an enhanced selection area. In some embodiments, the enhanced selection area may be presented in the shape of a rectangle, although other shapes may be employed. An enhanced selection area may include a subset of the strings (or keys) provided via the user interface. As a non-limiting example, the virtual instrument (e.g., a Guzheng) may include 21 strings. Within the user interface, all of the strings may be provided (e.g., at a spacing determined based at least in part on the display screen size of the device). The user may select an option (e.g., an icon, a menu option, etc.) to display an enhanced selection area that may contain any suitable subset (e.g., 5, 12, 13, 16, etc.) of the strings provided in the user interface. The spacing between strings within the user interface may be wider than the spacing provided strings within the enhanced selection area. Accordingly, the strings provided in the enhanced selection area may be more easily selectable (e.g., by tapping, swiping, clicking, etc.) than those of the user interface. The enhanced selection area may be overlaid over the user interface such that strings of the user interface may still be accessible while the enhanced selection area is displayed.

In some embodiments, the user interface may include multiple options to provide multiple enhanced selection areas for which differing enhanced views of the user interface may be provided. In some examples, each enhanced selection area may be associated with a particular configuration of strings (e.g., a subset of the strings provided in the original interface). In some cases, the particular configuration of strings of the enhanced selection area may be predetermined (e.g., based at least in part on a musical scale selection discussed further below, based at least in part on display capabilities of the device, etc.). By way of example, one enhanced selection area may include 16 strings (starting from the bottom) of the virtual instrument while another enhanced selection area may include another 16 strings (starting from the top) of the virtual instrument. Accordingly, in some examples, two simultaneously displayed enhanced selection areas may include common strings that are provided within each enhanced selection area, although not necessarily at a common location. Thus, as a non-limiting example, a "G" string may be provided near the bottom of one enhanced selection area, while another enhanced selection area may be configured to provide the same "G" string at a different location (e.g., nearer the middle, at the top, etc.).

In some embodiments, input may be provided at the user interface while one or more enhanced selection areas are displayed. A string selected at the user interface may cause visual feedback (e.g., animated string vibration) to occur at the location of the selected string as well as within any enhanced selection area that includes a corresponding string. Similarly, a string selected from within an enhanced selection area may cause visual feedback to be provided within the enhanced selection area, the user interface, and any other enhanced selection areas that provide the same string.

In some embodiments, a user interface of the virtual instrument may include a tremolo user interface element that may enable a picking/plucking technique to be simulated with audio output. For example, the user interface may include a button or slider that, when selected, causes audio output including repeated notes that simulate repeated plucking and/or plucking at the selected string location. Thus, a user can select a string and then select the tremolo user interface element to commence the picking/plucking simulation. The speed, volume, and or attack of the notes presented via the audio output may be controlled (e.g., by touch pressure) at the string selected and/or at the tremolo user interface element.

In at least one embodiment, a user interface of the virtual instrument may include a musical scale selection option that may enable customization of the musical scale with which the virtual instrument may be configured. A musical scale may be any set of musical notes that are ordered by fundamental frequency or pitch. Musical scales are often octatonic (8 notes per octave), heptatonic (7 notes per octave), hexatonic (6 notes per octave), pentatonic (5 notes per octave), tentratonic (4 notes per octave), or monotonic (1 note per octave), although any suitable number of notes per octave may be utilized herein. For example, a scale selection option may enable the user to select a number of musical scales options including, but not limited to, a major scale, a major pentatonic, a major blues scale, a mixolydian scale, a klezmer scale, a minor pentatonic scale, a minor blues scale, a minor scale, a harmonic minor scale, a dorian scale, and a south-east Asian scale, to name a few. Each scale may correspond to different sets of musical notes that are playable by the virtual instrument. Upon selecting a type of musical scale via the provided scale selection option, the virtual instrument interface may be configured to associate particular locations (e.g., string locations, keys of a non-stringed instrument, etc.) with particular notes of the selected musical scale. Accordingly, by utilizing the provided interface element (e.g., the scale selection option), the musical scale (e.g., the musical key) of the virtual instrument may be changed to match the mode, style, mood, or musical key desired. The user interface, and any enhanced selection areas, may be configured according to the musical scale selected.

In some examples, a user interface may provide the ability to simulate a pitch bend with the audio output being presented. For example, the user interface may enable the user to select a string and perform a dragging action (e.g., to the left or to the right). The dragging action may produce one or more pitch bend requests that individually indicate, among other things, the original note and/or the corresponding string location and a distance dragged. In response to a pitch bend request, the computing device may be configured to modify and/or select an audio sample of a bent note corresponding to the note selected. Alternatively, the audio sample may be manipulated to correspond to the bend note request. That is, an audio sample may be modulated to a higher or lower pitch according to the pitch bend request. In either case, the audio output may provide a note that is bent to a higher or lower pitch depending on the direction, speed, and/or drag distance. As with string input discussed herein, a pitch bend at the user interface may provide visual feedback may be provided at the user interface and at any display enhanced selection area for which a corresponding string is provided.

FIG. 1 is a simplified block diagram illustrating an example user interface 100 for a virtual instrument (e.g., a Guzheng) that includes a variety of user interface elements, according to at least one embodiment. A "Guzheng" is a Chinese plucked string instrument that has 16 (or more) strings and movable bridges. A modern Guzheng typically includes 21 strings and is 64 inches long. It has a large, resonant cavity that is traditionally made from wood. Guzheng players often wear fingerpicks on one or both hands with which strings of the Guzheng are plucked. The user interface 100 may be provided on a device (e.g., a tablet, a laptop, a desktop computer, etc.) having a relatively large display size.

In some examples, a user may activate and/or utilize the user interface 100 to play a virtual instrument. In one example, the user interface 100 may be configured in such as a way as to represent the strings of a physical instrument (e.g., a Guzheng). By way of example, the user interface 100 may include any suitable number (e.g., 21) of strings 102 corresponding to strings of the physical instrument. In some embodiments, the strings 102 may be spaced uniformly such that individual strings are spaced a spacing distance 103 apart. The spacing distance 103 may depend on the display capabilities of the device being utilized. For example, spacing distance 103 as displayed on a tablet or a laptop may be greater than the spacing distance 103 as displayed on a smartphone. Input may be received at the strings 102 via the user interface 100. The input may be an indication of two different things: the note that the user would like to play (e.g., identified based at least in part on a location of the input at the user interface) and the manner with which the user would like the note played (e.g., an attack, a volume, etc.).

In some examples, the user interface 100 may have two main view options (e.g., "Notes" option 104 and "Chords" option 106). In some embodiments, the "notes" option 104 and/or the "chords" option 106 may be labeled with other names. Within the notes view (corresponding to selection of the "notes" option 104), the user may be enabled to interact with a version of the virtual instrument (e.g., a Guzheng) that is laid out chromatically with intervallic relationships that match the physical (e.g., real) instrument. For example, strings 102 (e.g., 21 strings) may be presented within the user interface 100 to emulate the look of the physical Guzheng instrument. In notes view, the user interface 100 may also feature a scale selection option 108, which may enable the user to switch to a fixed scale. By default, the strings 102 may be configured according to a predetermined musical scale (e.g., D Major Pentatonic). Upon selecting the scale selection option 108, the user may be presented with a pop-up or other suitable menu from which a musical scale may be selected. Once a scale is selected (e.g., Major Pentatonic), the strings 102 may be provided according to the musical scale selected. In some embodiments, the number of and/or distance between strings 102 may be modified according to the musical scale selected.

In some embodiments, the notes view may enable the user to play a note by selecting any point on the strings 102, singularly or in combination. For each location selected (e.g., a location corresponding to string 110), an audio sample corresponding to the location may be presented via the speaker of the computing device. Upon selecting a string location, the string itself may brighten and/or appear to vibrate to give a visual indication that the audio output being presented corresponds to the string. Note volume may be based at least in part on an attack accelerometer value mapped to a MIDI velocity. Accordingly, a light tap may produce a quieter note, while a harder tap may produce a louder note.

In some embodiments, the user interface 100 may enable the user to perform a glissando playing technique. For example, a user may select a string location of the strings 102. The user may then maintain contact with the device screen and slide his finger up or down the string. As the finger slides up or down, presented audio output may increase in pitch or decrease in pitch accordingly corresponding to the notes of the strings traversed. Upon completion of a sliding motion, a string location may be determined nearest to the ending location of the glissando and a corresponding note may be presented via the speaker of the device.

The strings 102 may be configured to be selected and the individual string dragged to the left or to the right of the location selected. The dragging motion may produce a pitch bend request indicating the location (e.g., the string) and a distance dragged. The distance dragged may be used to determine a degree by which the note should be bent. A direction (e.g., left or right) of the drag may be used to determine how the pitch of the presented note (e.g., audio sample) should be modified (e.g., increase pitch or decrease pitch). In some examples, dragging to the left may bend the note upward (e.g., raise the pitch/frequency) to an amount that is based at least in part on the distance dragged. Similarly, dragging to the left may bend the note downward (e.g., lower the pitch/frequency). In some examples, dragging to the left may bend the note downward and dragging to the right may bend the note upward. However, in some examples, a dragging to the left or the right may perform the same type of bend (e.g., both may raise the pitch/frequency or both may lower the pitch/frequency). A threshold distance may be predetermined that constrains the bend to a certain pitch difference from the pitch of the original note. In other words, the pitch bend may be proportional to the distance dragged until a threshold distance is met or exceeded, at which point a particular pitch difference (e.g., a whole step from the pitch of the original note, a half step from the pitch of the original note, etc.) may be maintained.

In some embodiments, input may be received that relates to user interactions with a user interface element 112 (e.g., a tremolo user interface element). The input from user interface element 112 may indicate a speed and/or volume at which a note corresponding to the selected string may be repeatedly played to simulate a picking/plucking pattern. In some embodiments, input received at the user interface element 112 may be utilized to modify presented audio output to include a simulated picking/plucking technique. The user interface element 112 may include a control slider that enables the user to control the speed of the simulated picking/plucking. By way of example, the user interface element 112 may be used to modify the audio output to include a number of repeated notes that may be sounded on the physical instrument.

As a non-limiting example, once a note is selected (e.g., input received at a location along string 110), the user may increase or decrease the speed of the repeated notes by sliding his finger along the user interface element 112. In some embodiments, the left-most point of the user interface element 112 may correspond to a minimum picking speed, while the right-most point may correspond to a maximum picking speed. The audio output of the note may be modified and presented (e.g., on a speaker of the device) according to the string 110 selection and the selected location of the user interface element 112. Accordingly, if the user first selects the left-most location within the user interface element 112, a relatively slow picking may be simulated with the audio output. As the user slides his finger toward the right-most point of the user interface element 112, the picking speed may be increased to a picking speed corresponding to the location selected. Additionally, or alternatively, the speed of the simulated picking/plucking may be increased or decreased by touch. Accordingly, the user may lightly touch the user interface element 112 to cause slow simulated picking/plucking. By increasing the pressure of his touch on the user interface element 112, the speed of the simulated picking/plucking may be increased.

Additionally, the volume or attack of the simulated picking/plucking may be modified by touch. By way of example, the user may select a location within the user interface element 112 to cause simulated repetitive picking/plucking to commence. The user may then increase touch pressure at the string 110 and/or at the user interface element 112 to increase the volume and/or attack of the simulated picking/plucking. Similarly, the user may decrease touch pressure at either location to decrease the volume and/or attack of the simulated picking/plucking. In some examples, when input is no longer being received from the user interface element 112, the audio output may revert to playing the note selected without any simulated picking/plucking.

In some embodiments, the user interface 100 may also feature one or more user interface options (e.g., user interface option 114 and/or user interface option 116) for providing corresponding user interface elements (e.g., enhanced selection areas, discussed further below with respect to FIG. 2). The user interface option 114 and/or the user interface option 116 may include a button that may be labeled with a magnifying glass icon with a plus. It should be appreciated that the user interface options 114 and 116 are illustrative in nature and that any suitable option selection mechanism may be utilized. For example, the user interface option 114 and/or the user interface option 116 may be provided as a radio button, a menu option, a checkbox, or the like.

Figure 2:
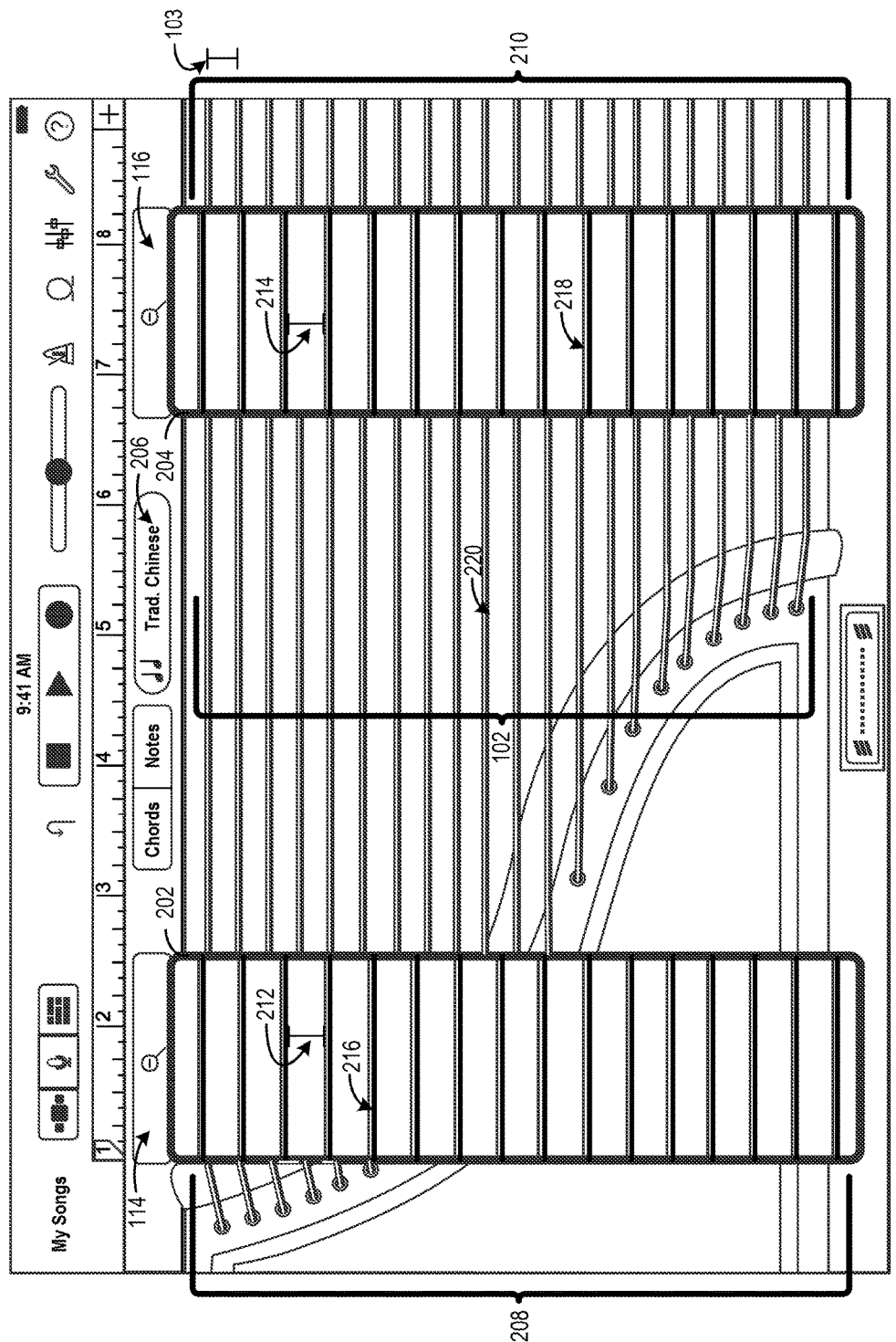
FIG. 2 is a simplified block diagram illustrating another example user interface featuring a variety of user interface elements corresponding to enhanced views of a virtual instrument (e.g., a Guzheng), according to at least one embodiment.

FIG. 2 is a simplified block diagram illustrating another example user interface 200 (e.g., user interface 100) featuring a variety of user interface elements (e.g., enhanced selection area 202 and enhanced selection area 204) corresponding to enhanced views of a virtual instrument (e.g., a Guzheng), according to at least one embodiment. The user interface 200 is intended to depict an example in which a "traditional Chinese scale" has been selected (as indicated with scale selection option 206). Accordingly, the string 102 (e.g., the strings 102 of FIG. 1) may be individually associated and configured according to the musical scale selected. The intervallic distance between notes associated with strings 102 may correspond to the predetermined arrangement of notes corresponding to the selected musical scale. Any suitable playing option described above in connection with the user interface 100 of FIG. 1 (e.g., string selection, glissando, note bending, repeated plucking/picking, etc.) may be similarly provided by the user interface 200.

The user interface 200, as depicted in FIG. 2, is intended to illustrate the enhanced selection area 202 after the user interface option 114 has been selected. Subsequent to selection of the user interface option 114, the enhanced selection area 202 may be visually transitioned as if appearing to slide from an edge of the display to an overlaid position upon the user interface 200. In some embodiments, the enhanced selection areas 202 and/or 204 may be slid to reside to a location adjacent to the edge of the device so to be positioned at an optimized distance from the edge of the device for usability. The display of the user interface option 114 may be modified as depicted in FIG. 2. For example, the user interface option 114 may feature a magnifying class icon with a minus sign. In response to selecting the user interface option 114, the enhanced selection area 202 may be displayed. Should the user select the user interface option 114 again, the enhanced selection area 202 may be removed and the user interface option 114 may again appear as depicted in FIG. 1. Accordingly, the user may utilize the user interface option 114 to toggle on and off the display of the enhanced selection area 202. User interface option 116 may be used in a similar manner to toggle on and off display of the enhanced selection area 204. In some embodiments, a single user interface option (e.g., a single button or other suitable selection mechanism) may be utilized to toggle on/off display of both enhanced selection areas depicted in FIG. 2. Although only two enhanced selection areas may be depicted in FIG. 2, it should be appreciated that any suitable number of enhanced selection areas may be provided, with corresponding user interface options or a shared user interface option controlling their respective display.

In some embodiments, each of the enhanced selection areas 202 and 204 may be overlaid over the user interface 100 as depicted by the user interface 200, or the enhanced selection areas 202 and/or 204 may be provided adjacent to a smaller version of the user interface 200. Although the enhanced selection areas appear to be similarly shaped and sized within FIG. 2, it is contemplated that enhanced selection areas may utilize different shape(s) and/or size(s) and in some cases may differ from one another. Within each of the enhanced selection areas 202 and 204, a number of strings corresponding to a subset of the strings 102 may be provided. Specifically, the enhanced selection area 202 may include string subset 208 (e.g., corresponding to 16 strings), while the enhanced selection area 204 may include string subset 210 (e.g., also corresponding to 16 strings). The string subset 208 may have a greater or fewer number of strings than the subset 210, or the each subset may contain the same number of strings (e.g., 16). The strings within the string subset 208 may be configured to correspond to the same collection of notes as the strings within the string subset 210, or the subsets may be configured to correspond to different collections of notes. In some cases, the string subset 208 and the string subset 210 may share at least one common string that is associated with the same note. By way of example only, string 216 and string 218 may correspond to the same note.

The number of strings provided within the enhanced selection area 202 and the enhanced selection area 204 may have the same number of strings as the strings 102 (e.g., 21), or each enhanced selection area may fewer (e.g., 16), and in some cases differing number of strings (e.g., 14 and 16, respectively, 10 and 8, respectively, etc.) than the number of strings included in the strings 102. The distance between the strings within string subset 208 (indicated by spacing distance 212) and/or the distance between the strings within string subset 210 (indicated by spacing distance 214) may be larger (e.g., indicating wider spacing) than the spacing distance 103 between strings 102. The intervallic distances between the strings of the string subset 208 and/or the strings of the string subset 210 may include the same intervallic distances between strings 102, or the intervallic distances may differ. Said another way, while the notes of the strings 102 may vary by a half-step musical interval from one string to another (or according to a predetermined interval pattern associated with the musical scale selected), the notes corresponding to the strings of string subset 208 may vary by a different interval (e.g., a whole step, a step and a half, etc.) or a different predetermined interval pattern. In a similar manner, the intervallic distances between strings 210 may vary from the strings 102 and/or the strings of the string subset 208.

In some embodiments, the number of strings provided within the enhanced selection area 202 and/or the enhanced selection area 204 may vary between devices based at least in part on a capability of the device display. For example, the enhanced selection areas 204 and 206, as depicted, may be utilized on a tablet, laptop, desktop computer, or any suitable device having a display size over a threshold amount. The enhanced selection areas provided may be modified for devices having different capabilities as will be discussed further below with respect to FIG. 3.

Input may be received at the user interface 200 utilizing the strings 102, the string subset 208, and/or the string subset 210. By way of example, and string selection or playing technique (e.g., plucking/picking a string, a glissando, picking a string while adding tremolo, etc.) may be utilized from any suitable combination of the strings 102, the string subset 208, and/or the string subset 210. The user interface 200 may provide feedback via any suitable corresponding string according to an input received. For example, a user may utilize a touch screen on a device to tap on the location of the display corresponding to the string 216. In some examples, the string 216 may correspond to the string 218 and the string 220. Upon tapping the string, visual feedback may be provided at the string 216, the string 218, and the string 220 depicting a vibration at each string. Similarly, were the user to select the string 220, visual feedback may be provided at string 216 and 218. Accordingly, any visual feedback provided at one location, may be similarly provided at other locations within the user interface 200 that correspond to the same note.

By utilizing the enhanced selection area 202 and/or the enhanced selection area 204, the user can more accurately select a particular string(s) then by using the user interface 100 alone. The enhanced selection areas 202 and 204 may provide wider spacing, reducing the risk of unintended inputs by the user. Additionally, the user may be visually informed of relationships between the user interface 100 and the enhanced selection area 202 and/or the enhanced selection area 204 as visual feedback corresponding to the user's inputs may be provided at any corresponding string, regardless of the particular location utilized to provide such input. By being informed of such relationships the user is provided multiple locations from which input may be provided, enabling the user to provide complex inputs with ease.

Figure 3:
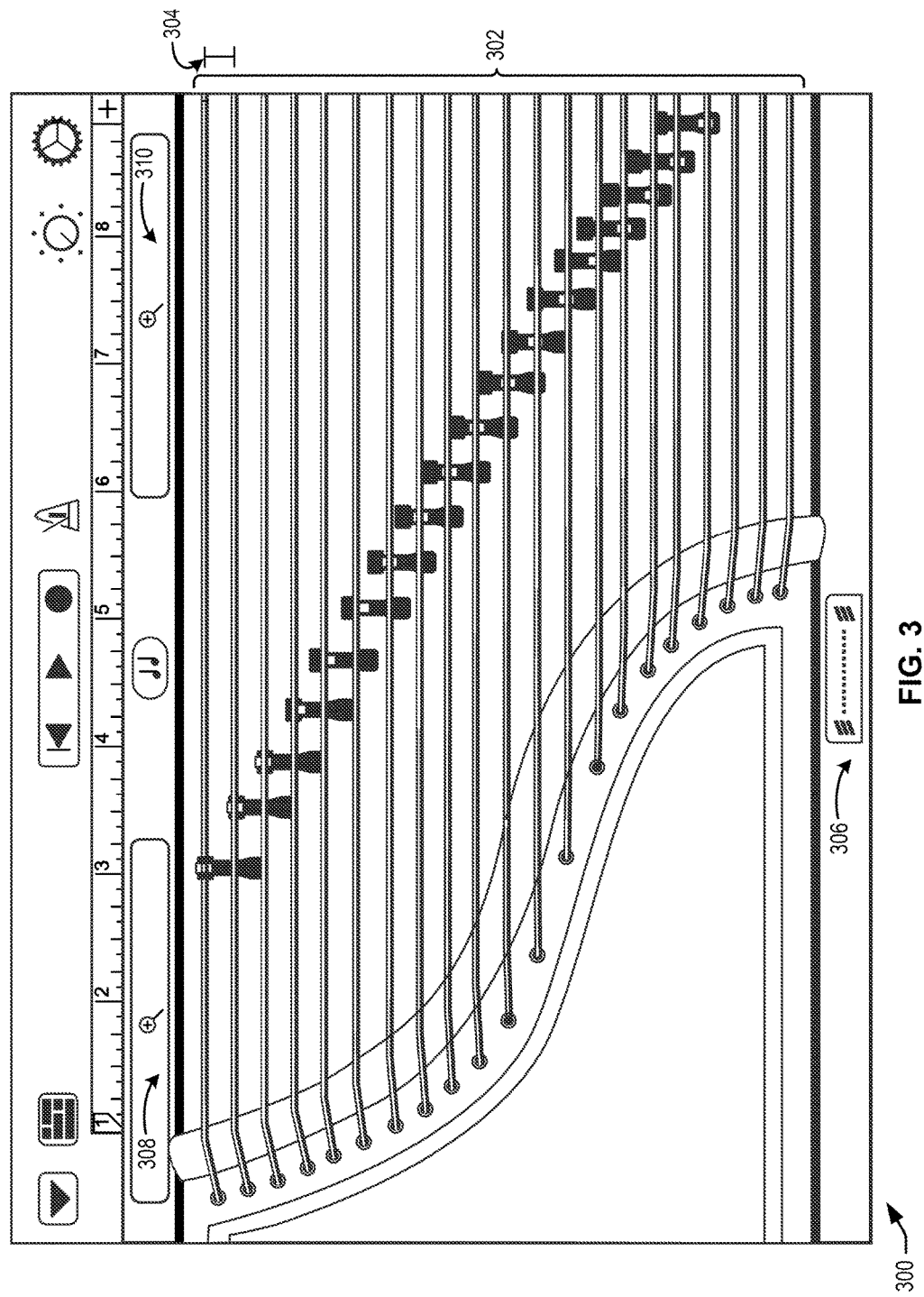
FIG. 3 is a simplified block diagram illustrating another example user interface for a virtual instrument (e.g., a Guzheng) that includes a variety of user interface elements, according to at least one embodiment.

FIG. 3 is a simplified block diagram illustrating another example user interface 300 (e.g., corresponding to an alternate version of user interface 100) for a virtual instrument (e.g., a Guzheng) that includes a variety of user interface elements, according to at least one embodiment. The user interface 300 is intended to depict an alternate version of the user interface 100 as provided on a device (e.g., a smartphone) having a relatively small display size.

In some embodiments, upon initializing the user interface 300 (e.g., at the start of an application that provides the functionality herein), device capabilities corresponding to the display may be determined. As a non-limiting example, a device serial number (or other suitable identifier) and/or device type may be determined (e.g., from locally stored data on the device). The device serial number and/or device type may be utilized to determine a size, shape, and/or resolution of the device display. In some embodiments, the serial number and/or the device type may be utilized with a previously generated mapping to determine a configuration for the user interface 300. The mapping may associate a device type with a particular configuration, even though any suitable number of configurations may be available. The associated configuration may correspond to a particular user interface that has been designed and optimized for a particular device and/or display capability (e.g., size, shape, resolution, etc.). In some examples, the associated configuration may specify a number of strings (e.g., 13), a musical scale to which the strings relate (e.g., D Major Pentatonic, etc.), a spacing distance 604 between the strings provided, or the like.

Similarly to user interface 100, user interface 300 may include any suitable number (e.g., 21) of strings 302 (e.g., strings 102) corresponding to strings of the physical instrument (e.g., a Guzheng). In some embodiments, the strings 302 may be spaced uniformly such that individual strings are spaced a spacing distance 304 apart. The spacing distance 304 may depend on the display capabilities of the device being utilized. For example, spacing distance 304 may be less than the spacing distance 103 of FIG. 1 (due to the smartphone being utilized having a smaller display than a laptop or tablet utilized with user interface 100). Input may be received at the strings 302 via the user interface 300 in a similar manner as discussed above in connection with FIG. 1.

Although not depicted, the user interface 300 may include two main view options (e.g., corresponding to the "Notes" option 104 and "Chords" option 106 of FIG. 1). Additionally, the user interface 300 may also feature a scale selection option (not depicted), which may enable the user to switch to a fixed scale as discussed above with respect to FIG. 1. Initially, the strings 302 may be configured according to a predetermined default musical scale (e.g., D Major Pentatonic).

The user may play a note by selecting any point on the strings 302, singularly or in combination. For each location selected, an audio sample corresponding to the location may be presented via the speaker of the computing device. Upon selecting a string location, the string itself may brighten and/or appear to vibrate to give a visual indication that the audio output being presented corresponds to the string. Note volume may be based at least in part on an attack accelerometer value mapped to a MIDI velocity. Accordingly, a light tap may produce a quieter note, while a harder tap may produce a louder note. Glissando, pitch bend, and/or tremolo playing techniques may also be enabled within the user interface 300 in a manner similar to that discussed above in connection with FIG. 1. For example, a tremolo effect (e.g., repeated notes) may be applied based at least in part on input received at a user interface element 306 (e.g., the user interface element 112 of FIG. 1). Once a note is selected, the user may increase or decrease the speed of the repeated notes by sliding his finger along the user interface element 306 or at the selected string (e.g., according to a pressure increase/decrease at the location of the display that corresponds to the selected string).

In some embodiments, the user interface 300 may also feature one or more user interface options such as user interface option 308 (e.g., user interface option 114) and/or user interface option 310 (e.g., user interface option 116). These user interface options may be utilized to provide corresponding user interface elements (e.g., enhanced selection areas, discussed further below with respect to FIG. 4). The user interface option 308 and/or the user interface option 310 may include a button that may be labeled with a magnifying glass icon with a plus. It should be appreciated that the user interface options 308 and 310 are illustrative in nature and that any suitable option selection mechanism may be utilized. For example, the user interface option 308 and/or the user interface option 310 may be provided as a radio button, a menu option, a checkbox, or the like.

Figure 4:
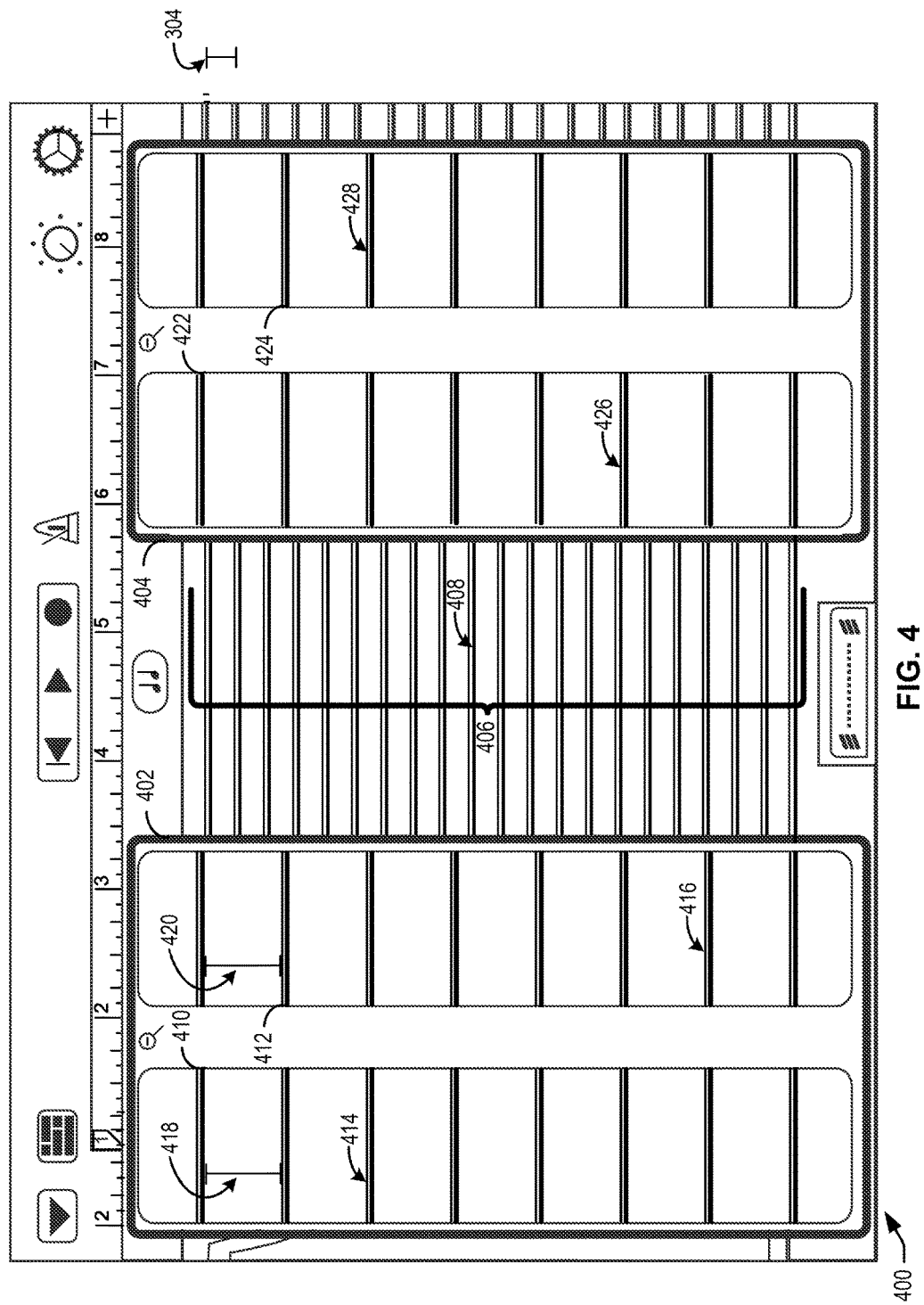
FIG. 4 is a simplified block diagram illustrating yet another user interface featuring a variety of user interface elements corresponding to enhanced views of a virtual instrument (e.g., a Guzheng), according to at least one embodiment.

FIG. 4 is a simplified block diagram illustrating yet another user interface 400 featuring a variety of user interface elements (e.g., enhanced selection area 402 and enhanced selection area 404) corresponding to enhanced views of a virtual instrument (e.g., a Guzheng), according to at least one embodiment.

The strings 406 (e.g., the strings 102 of FIG. 1), including the string 408, may be individually associated and configured according to a default or selected musical scale. Accordingly, the intervallic distance between notes associated with strings 406 may correspond to the predetermined arrangement of notes corresponding to the selected musical scale. Any suitable playing option described above in connection with the user interfaces 100-300 of FIGS. 1-3 (e.g., string selection, note bending, tremolo, attack, glissando, etc.) may be similarly provided by the user interface 400.

The user interface 400, as depicted in FIG. 4, is intended to illustrate the enhanced selection area 402 after the user interface option 308 of FIG. 3 has been selected. Subsequent to selection of the user interface option 308, the enhanced selection area 404 may be visually transitioned as if appearing to slide from an edge of the display to an overlaid position upon the user interface 400. In some embodiments, the enhanced selection areas 402 and/or 404 may be slid to reside to a location adjacent to the edge of the device so to be positioned at an optimized distance from the edge of the device for usability. The display of the user interface option 308 may be modified as depicted in FIG. 2. For example, the user interface option 308 may feature a magnifying class icon with a minus sign. In response to selecting the user interface option 308, the enhanced selection area 402 may be displayed. Should the user select the user interface option 308 again, the enhanced selection area 402 may be removed and the user interface option 308 may again appear as depicted in FIG. 3. Accordingly, the user may utilize the user interface option 308 to toggle on and off the display of the enhanced selection area 402. User interface option 310 of FIG. 3 may be used in a similar manner to toggle on and off display of the enhanced selection area 404. In some embodiments, a single user interface option (e.g., a single button or other suitable selection mechanism) may be utilized to toggle on/off display of both enhanced selection areas depicted in FIG. 4. Although only two enhanced selection areas may be depicted in FIG. 4, it should be appreciated that any suitable number of enhanced selection areas may be provided, with corresponding user interface options or a shared user interface option controlling their respective display.

In some embodiments, each of the enhanced selection areas 402 and 404 may be overlaid over the user interface 300 as depicted by the user interface 400, or the enhanced selection areas 402 and/or 404 may be provided adjacent to a smaller version of the user interface 400. Although the enhanced selection areas appear to be similarly shaped and sized within FIG. 4, it is contemplated that enhanced selection areas may utilize different shape(s) and/or size(s) and in some cases may differ from one another. Within each of the enhanced selection areas 402 and 404, one or more (e.g., two) subset selection areas corresponding to subsets of strings 406 may be provided. As depicted, the enhanced selection area 402 may include subset selection area 410 (e.g., corresponding to 8 strings of the strings 406), and subset selection area 412 (e.g., also corresponding to 8 strings of the strings 406). The subset selection area 410 may include a greater, a fewer, or an equal number of strings as the subset selection area 412. The strings within the subset selection area 410 may be configured to correspond to the same strings within the subset selection area 412, or the subset selection areas may be configured to correspond to different subsets of strings 406. In some cases, the subset selection area 410 and the subset selection area 412 may share at least one common string that is associated with the same note/string of the strings 406. By way of example only, string 414 and string 416 may correspond to the same note/string. In some examples, string 414, string 416, and string 408 may correspond to the same string of the virtual instrument.

In some embodiments, the enhanced selection area 404 may include subset selection area 422 (e.g., corresponding to 8 strings of the strings 406), and subset selection area 424 (e.g., also corresponding to 8 strings of the strings 406). The subset selection area 422 may include a greater, a fewer, or an equal number of strings as the subset selection area 424. The subset selection areas 422 and/or 424 may include a greater, a fewer, or an equal number of strings as the subset selection areas 410 and/or 412. The strings within the subset selection area 422 may be configured to correspond to the same strings within the subset selection area 424, or the subset selection areas may be configured to correspond to different subsets of strings 406. The strings within the subset selection areas 422/424 may be configured to correspond to the same strings within the subset selection areas 410/412, or the subset selection areas may be configured to correspond to different subsets of strings 406. In some cases, the subset selection area 422 and the subset selection area 424 may share at least one common string that is associated with the same note/string of the strings 406. By way of example only, string 426 and string 428 may correspond to the same note/string. In some examples, string 426, string 428, and string 408 may correspond to the same string of the virtual instrument. In still further examples, strings 414, 416, 426, and/or 428 (or any suitable combination of the above) may correspond to string 408.

The number of strings provided within the subset selection area(s) (410, 412, 422, and/or 424) may have a greater, a fewer, or an equal number of strings as the strings 406 (e.g., 21) and, in some cases, the number of strings may differ between subset selection areas. The distance between the strings within subset selection area 410 (indicated by spacing distance 418) and/or the distance between the strings within subset selection area 412 (indicated by spacing distance 420) may be larger (e.g., indicating wider spacing) than the spacing distance 304 between strings 406. Similarly, the subset selection areas 422 and 424 may have different corresponding spacing distances than the spacing distance 304, and/or the spacing distance 418, and/or the spacing distance 420. The intervallic distances between the respective strings of the subset selection areas 410, 412, 422, and/or 424 may include the same intervallic distances between strings 406, or the intervallic distances may differ. Said another way, while the notes of the strings 406 may vary by a half-step musical interval from one string to another (or according to a predetermined interval pattern associated with the musical scale selected), the notes corresponding to the strings of a subset selection area may vary by a different interval (e.g., a whole step, a step and a half, etc.) or a different predetermined interval pattern. In a similar manner, the intervallic distances between strings of one subset selection area (e.g., subset selection area 410) may vary from the intervallic distances of the strings 402 and/or the intervallic distance of strings of another subset selection area (e.g., subset selection area 412).

In some embodiments, the number of strings provided within the subset selection area(s) of the enhanced selection area 402 and/or the subset selection areas of the enhanced selection area 404 may vary between devices based at least in part on a capability of the device display. For example, the enhanced selection areas 402 and 404, as depicted, may be utilized on a smartphone, a wearable device, or any suitable device having a display size under a threshold amount.

Input may be received at the user interface 400 utilizing the strings 406 and/or any of the subset selection areas depicted in FIG. 4. By way of example, and string selection or playing technique (e.g., plucking/picking a string, a glissando, picking a string while adding tremolo, etc.) may be input using the any of the strings 406 and/or any strings associated with a subset selection area. The user interface 400 may provide feedback via any suitable corresponding string according to an input received. For example, a user may utilize a touch screen on a device to tap on the location of the display corresponding to the string 408. In some examples, the string 408 may correspond to the string 414, the string 416, the string 426, and the string 428. Upon tapping the string 406, visual feedback may be provided at the string 406, the string 414, the string 416, the string 426, and the string 428. The visual feedback may depict a vibration at each string. Similarly, were the user to select any of the corresponding strings within a subset selection area (e.g., string 414, string 416, string 426, or string 428), visual feedback may be provided at corresponding strings (including the string 408). Accordingly, any visual feedback provided at one location, may be similarly provided at other locations within the user interface 400 that correspond to the same note/string.

By utilizing the enhanced selection area 402 and/or the enhanced selection area 404, the user can more accurately select a particular string(s) then by using the user interface 300 alone. The enhanced selection areas 402 and 404 may provide subset selection area(s) and wider spacing between strings, reducing the risk of unintended inputs by the user. Additionally, the user may be visually informed of relationships between the strings 406 and strings ultimately contained within the enhanced selection area 402 and/or the enhanced selection area 404. As discussed, the user may be informed of such relationships given the visual feedback (corresponding to the input) that is provided at any corresponding string (regardless of the particular location utilized to provide such input). By being informed of such relationships the user is provided multiple locations from which input may be provided, enabling the user to provide complex inputs with ease.

Figure 5:
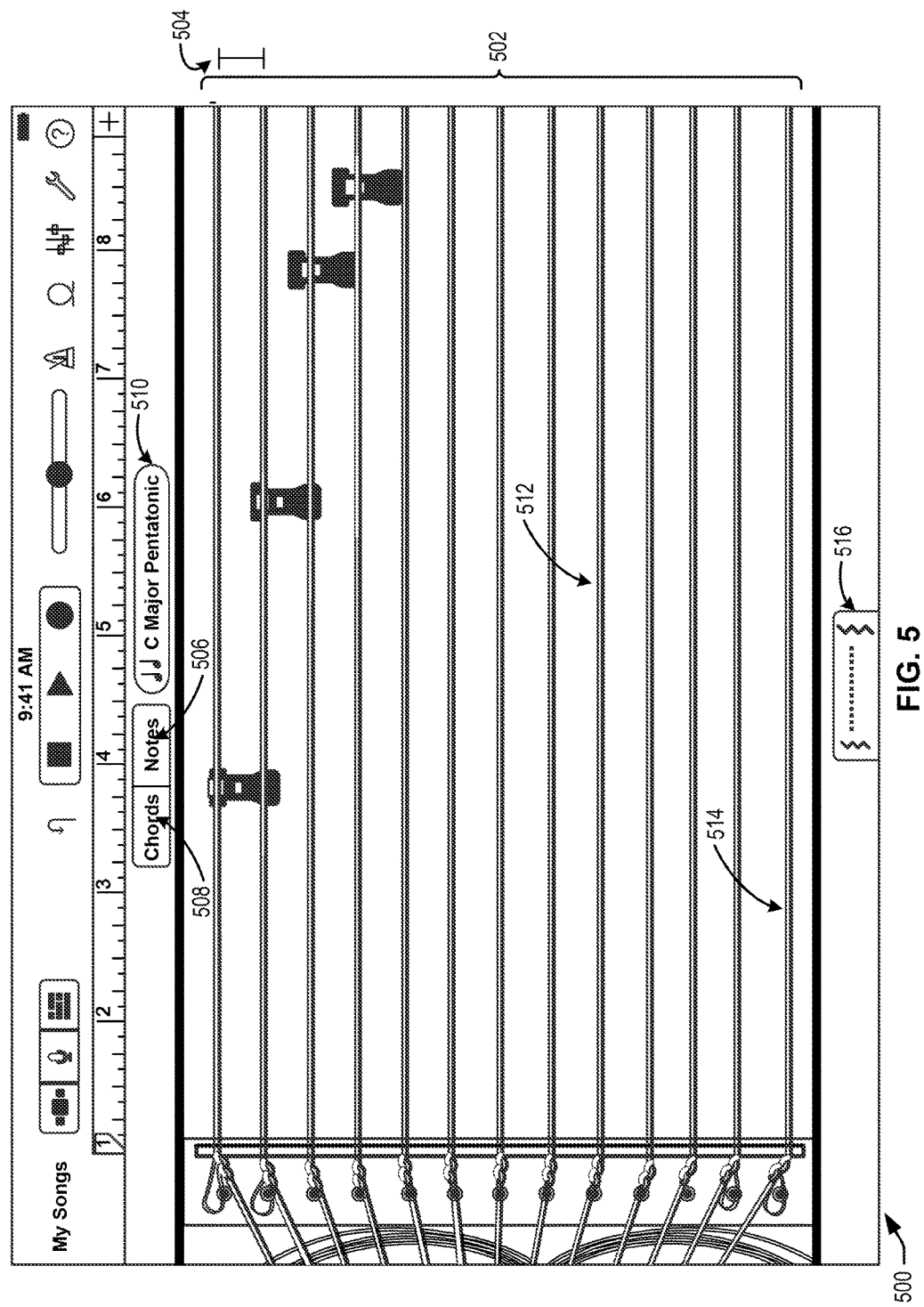
FIG. 5 is a simplified block diagram illustrating an example user interface for a virtual instrument (e.g., a Koto) that includes a variety of user interface elements, according to at least one embodiment.

FIG. 5 is a simplified block diagram illustrating an example user interface 500 for a virtual instrument (e.g., a Koto) that includes a variety of user interface elements, according to at least one embodiment. A "Koto" is a traditional Japanese instrument that has 13 strings and movable bridges. A Koto may alternatively have 17 strings. Koto players often pluck the strings using three finger picks (e.g., on the thumb, index finger, and middle finger). The user interface 500 is intended to depict a user interface as provided on a device (e.g., a tablet, a laptop, a desktop computer, etc.) having a relatively large display size.

In some examples, a user may activate and/or utilize the user interface 500 to play a virtual instrument. In one example, the user interface 500 may be configured in such as a way as to represent the strings of a physical instrument (e.g., a Koto). By way of example, the user interface 500 may include any suitable number (e.g., 13) of strings 502 corresponding to strings of the physical instrument. In some embodiments, the strings 502 may be spaced uniformly such that individual strings are spaced a spacing distance 504 apart. The spacing distance 504 may depend on the display capabilities of the device being utilized. For example, spacing distance 504 as displayed on a tablet or a laptop may be greater than the spacing distance 504 as displayed on a smartphone. Input may be received at the strings 502 via the user interface 500. The input may be an indication of two different things: the note that the user would like to play (e.g., identified based at least in part on a location of the input at the user interface) and the manner with which the user would like the note played.

In some examples, the user interface 500 may have two main view options (e.g., "Notes" option 506 and "Chords" option 508). In some embodiments, the "notes" option 506 and/or the "chords" option 508 may be labeled with other names. Within the notes view, the user may be enabled to interact with a version of the virtual instrument (e.g., a Koto) that is laid out chromatically with intervallic relationships that match the physical (e.g., real) instrument. For example, strings 502 (e.g., 13 strings as depicted, or 17 strings) may be presented within the user interface 500 to emulate the look of the physical Koto instrument. In notes view, the user interface 500 may also feature a scale selection option 510, which may enable the user to switch to a fixed scale. Initially, the strings 502 may be configured according to a predetermined default musical scale (e.g., D Major Pentatonic). Upon selecting the scale selection option 510, the user may be presented with a pop-up or other suitable menu from which a musical scale may be selected. Once a scale is selected (e.g., C Major Pentatonic), the strings 502 may be configured and provided according to the musical scale selected. In some embodiments, the number of and/or distance between strings 504 may be modified according to the musical scale selected.

In some embodiments, the notes view may enable the user to play a note by selecting any point on the strings 502, singularly or in combination. For each location selected (e.g., a location corresponding to string 512), an audio sample corresponding to the location may be presented via the speaker of the computing device. Upon selecting a string location, the string itself may brighten and/or appear to vibrate to give a visual indication that the audio output being presented corresponds to the string. Note volume may be based at least in part on an attack accelerometer value mapped to a MIDI velocity. Accordingly, a light tap may produce a quieter note, while a harder tap may produce a louder note.

In some embodiments, the user interface 500 may enable the user to perform a glissando playing technique. For example, a user may select a string location (e.g., corresponding to the string 514) of the strings 502. The user may then maintain contact with the device screen and slide his finger up or down the string 502. As the finger slides up or down, presented audio output may increase in pitch or decrease in pitch accordingly corresponding to the notes of the strings traversed. Upon completion of a sliding motion, a string location may be determined nearest to the ending location of the glissando and a corresponding note may be presented via the speaker of the device.

The strings 502 may be configured to be selected and the individual string dragged to the left or to the right of the location selected. The dragging motion may produce a pitch bend request indicating the location (e.g., the note/fret) and a distance dragged. The distance dragged may be used to determine a degree by which the note should be bent. A direction (e.g., left or right) of the drag may be used to determine how the pitch of the presented note (e.g., audio sample) should be modified (e.g., increase pitch or decrease pitch). In some examples, dragging to the left may bend the note upward (e.g., raise the pitch/frequency) to an amount that is based at least in part on the distance dragged. Similarly, dragging to the left may bend the note downward (e.g., lower the pitch/frequency). However, in some examples, a dragging to the left or the right may perform the same type of bend (e.g., both may raise the pitch/frequency or both may lower the pitch/frequency). A threshold distance may be predetermined that constrains the bend to a certain pitch difference from the pitch of the original note. In other words, the bend may occur proportional to the distance dragged until a threshold distance is met or exceeded, at which point a particular pitch difference (e.g., a whole step from the pitch of the original note, a half step from the pitch of the original note, etc.) may be maintained.

In some embodiments, input may be received that relates to user interactions with a user interface element 516 (e.g., a tremolo user interface element). The input from user interface element 516 may indicate a speed and/or volume at which a note corresponding to the selected string may be repeatedly played to simulate a picking pattern. In some embodiments, input received at the user interface element 516 may be utilized to modify presented audio output to include a simulated picking technique. The user interface element 516 may include a control slider that enables the user to control the speed of the simulated picking. By way of example, the user interface element 516 may be used to modify the audio output to include a number of repeated notes that may be sounded on the physical instrument.

As a non-limiting example, once a note is selected (e.g., input received at a location along string 512), the user may increase or decrease the speed of the repeated notes by sliding his finger along the user interface element 516. In some embodiments, the left-most point of the user interface element 516 may correspond to a minimum picking speed, while the right-most point may correspond to a maximum picking speed. The audio output of the note may be modified and presented (e.g., on a speaker of the device) according to the string 512 selection and the selected location of the user interface element 516. Accordingly, if the user first selects the left-most location within the user interface element 516, a relatively slow picking may be simulated with the audio output. As the user slides his finger toward the right-most point of the user interface element 516, the picking speed may be increased to a picking speed corresponding to the location selected. Additionally, or alternatively, the speed of the simulated picking may be increased or decreased by touch. Accordingly, the user may lightly touch the user interface element 516 to cause slow simulated picking. By increasing the pressure of his touch on the user interface element 516, the speed of the simulated picking may be increased.

Additionally, the volume or attack of the simulated picking may be modified by touch. By way of example, the user may select a location within the user interface element 516 to cause simulated repetitive picking to commence. The user may then increase touch pressure at the string 512 and/or at the user interface element 516 to increase the volume and/or attack of the simulated picking. Similarly, the user may decrease touch pressure at either location to decrease the volume and/or attack of the simulated picking. In some examples, when input is no longer being received from the user interface element 516, the audio output may revert to playing the note selected without any simulated picking.

Figure 6:
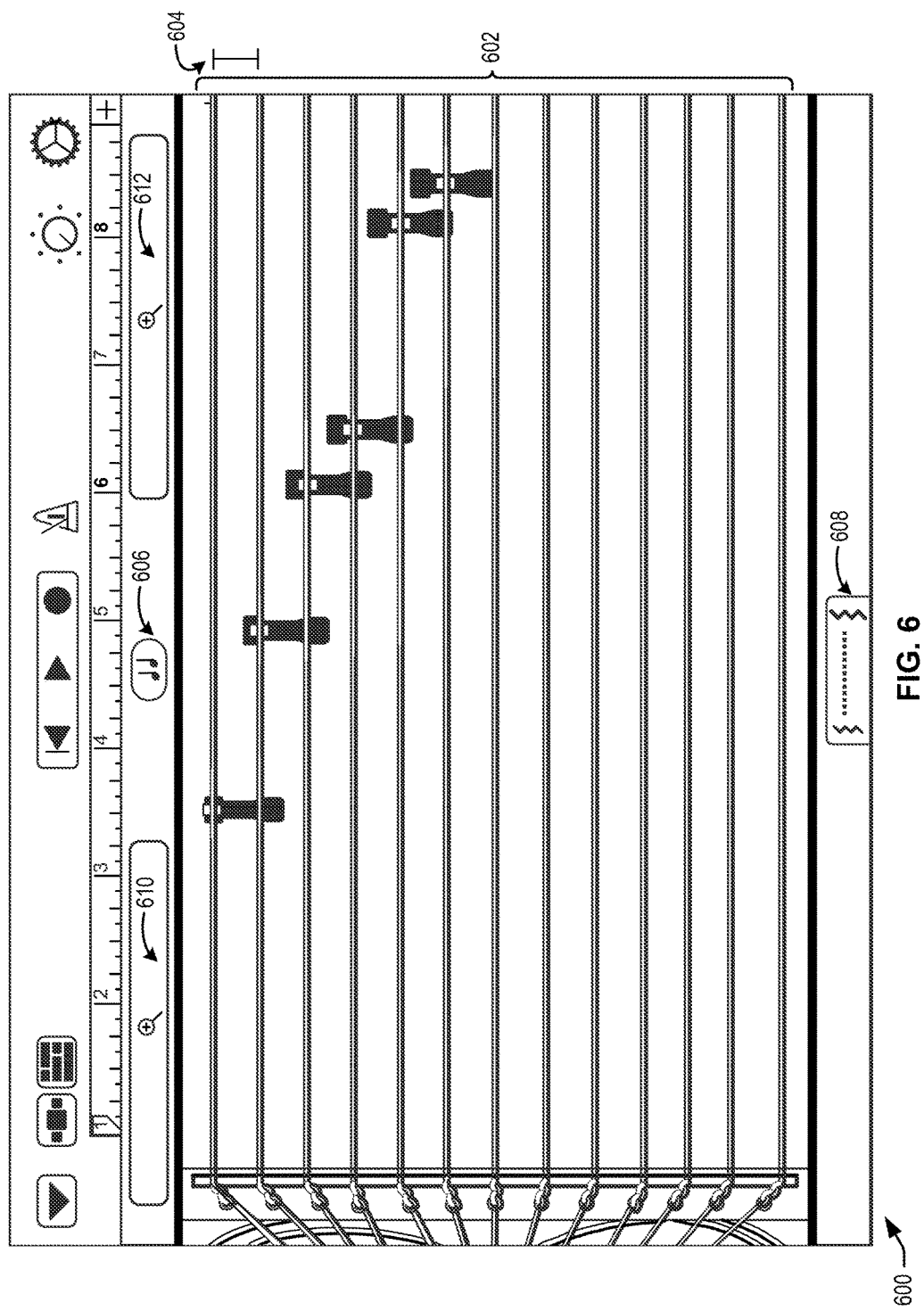
FIG. 6 is a simplified block diagram illustrating another example user interface for a virtual instrument (e.g., a Koto) that includes a variety of user interface elements, according to at least one embodiment.

FIG. 6 is a simplified block diagram illustrating another example user interface 600 for a virtual instrument (e.g., a Koto) that includes a variety of user interface elements (e.g., user interface element 602 and/or user interface element 604, according to at least one embodiment. The user interface 600 is intended to depict an alternate version of the user interface 500 as provided on a device (e.g., a smartphone) having a relatively small display size.

In some embodiments, upon initializing the user interface 600 (e.g., at the start of an application that provides the functionality herein), device capabilities corresponding to the display may be determined. As a non-limiting example, a device serial number and/or device type may be determined (e.g., from locally stored data on the device). The device serial number and/or device type may be utilized to determine a size, shape, and/or resolution of the device display. In some embodiments, the serial number and/or the device type may be utilized with a previously generated mapping to determine a configuration for the user interface 600. The mapping may associate a device type with a particular configuration, even though any suitable number of configurations may be available. The associated configuration may correspond to a particular user interface that has been designed and optimized for a particular device and/or display capability (e.g., size, shape, resolution, etc.). The determined configuration may specify a number of strings (e.g., 13), a musical scale to which the strings relate (e.g., D Major Pentatonic, etc.), a spacing distance 604 between the strings provided, or the like.

Similarly to user interface 500, user interface 600 may include any suitable number (e.g., 13) of strings 602 (e.g., strings 502) corresponding to strings of the physical instrument (e.g., a Koto). In some embodiments, the strings 602 may be spaced uniformly such that individual strings are spaced a spacing distance 604 apart. The spacing distance 604 may depend on the display capabilities of the device being utilized. For example, spacing distance 604 may be less than the spacing distance 504 of FIG. 5 (due to the smartphone being utilized having a smaller display than a laptop or tablet utilized to provide user interface 500). Input may be received at the strings 602 via the user interface 600 in a similar manner as discussed above in connection with FIG. 1.

Although not depicted, the user interface 600 may include two main view options (e.g., corresponding to the "Notes" option 506 and "Chords" option 508 of FIG. 5). Additionally, the user interface 600 may also feature a scale selection option 606 (e.g., corresponding to the scale selection option 510 of FIG. 5), which may enable the user to switch to a fixed scale as discussed above with respect to FIG. 5. By default, that is, prior to user selection of a particular musical scale via the scale selection option 606, the strings 602 may be configured according to a predetermined default musical scale (e.g., D Major Pentatonic).

The user may play a note by selecting any point on the strings 602, singularly or in combination. For each location selected, an audio sample corresponding to the location may be presented via the speaker of the computing device. Upon selecting a string location, the string itself may brighten and/or appear to vibrate to give a visual indication that the audio output being presented corresponds to the string. Note volume may be based at least in part on an attack accelerometer value mapped to a MIDI velocity. Accordingly, a light tap may produce a quieter note, while a harder tap may produce a louder note. Glissando, pitch bend, and/or tremolo playing techniques may also be enabled within the user interface 600 in a manner similar to that discussed above in connection with FIG. 5. For example, a tremolo effect (e.g., repeated notes) may be applied based at least in part on input received at a user interface element 608 (e.g., the user interface element 516 of FIG. 5). Once a note is selected, the user may increase or decrease the speed of the repeated notes by sliding his finger along the user interface element 516 or at the selected string (e.g., according to a pressure increase/decrease at the location of the display that corresponds to the selected string).

In some embodiments, the user interface 600 may also feature one or more user interface options such as user interface option 610 and/or user interface option 612. These options may be provided within the user interface 600 based at least in part on a determination that the spacing distance 604 falls below a predetermined threshold. These options may not be provided within the user interface 500 based at least in part on a determination that the spacing distance 504 of FIG. 5 exceeds the predetermined threshold. Returning to FIG. 6, these user interface options may be utilized to provide corresponding user interface elements (e.g., enhanced selection areas, discussed further below with respect to FIG. 7). As depicted in FIG. 6, the user interface option 610 and/or the user interface option 612 may include a button that may be labeled with a magnifying glass icon with a plus. It should be appreciated that the user interface options 610 and 612 are illustrative in nature and that any suitable option selection mechanism may be utilized. For example, the user interface option 610 and/or the user interface option 612 may be provided as a radio button, a menu option, a checkbox, or the like, with any suitable label (e.g., text, an icon, a color, etc.) or with no label at all.

Figure 7:
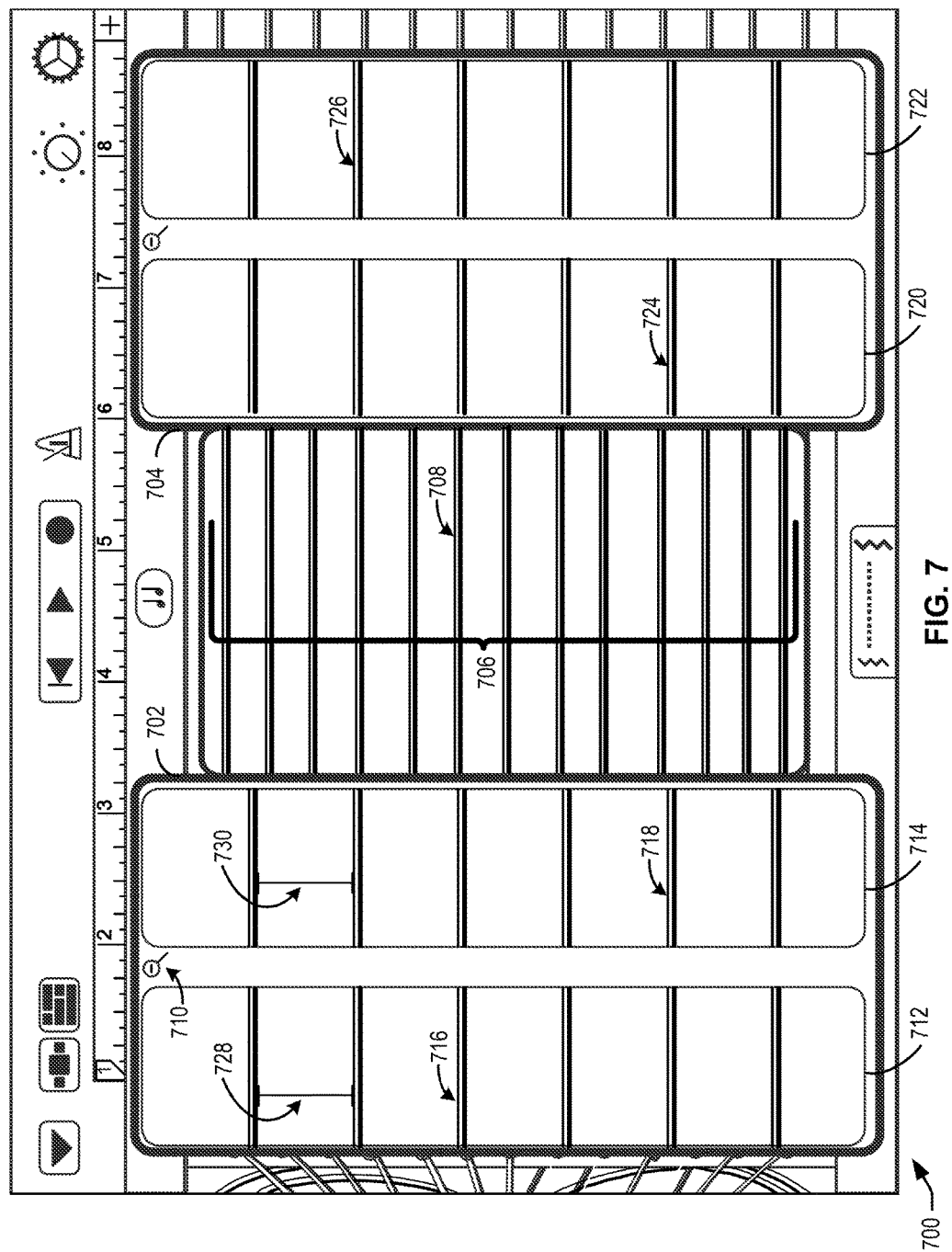
FIG. 7 is a simplified block diagram illustrating yet another user interface featuring a variety of user interface elements corresponding to enhanced views of a virtual instrument (e.g., a Koto), according to at least one embodiment.

FIG. 7 is a simplified block diagram illustrating yet another user interface 700 featuring a variety of user interface elements (e.g., enhanced selection area 702 and enhanced selection area 704) corresponding to enhanced views of a virtual instrument (e.g., a Koto), according to at least one embodiment.

The strings 706 (e.g., the strings 102 of FIG. 1), including the string 708, may be individually associated and configured according to a default or selected musical scale. Accordingly, the intervallic distance between notes associated with strings 706 may correspond to the predetermined arrangement of notes corresponding to the selected musical scale. Any suitable playing option described above in connection with the user interfaces 500 and 600 of FIGS. 5 and 6 (e.g., string selection, note bending, tremolo, attack, glissando, etc.) may be similarly provided by the user interface 700.

The user interface 700, as depicted in FIG. 7, is intended to illustrate the enhanced selection area 702 after the user interface option 610 of FIG. 6 has been selected. Similarly, the enhanced selection area 704 may be provided after the user interface option 612 of FIG. 6 has been selected. If a common user interface option is provided, then the enhanced selection areas 702 and 704 may be provided upon selection of the common user interface option. Subsequent to selection of a user interface option (e.g., user interface option 610), an enhanced selection area (e.g., enhanced selection area 702) may be visually transitioned as if appearing to slide from an edge of the display to an overlaid position upon the user interface 700. In some embodiments, the enhanced selection areas 702 and/or 704 may be slid to reside to a location adjacent to the edge of the device so to be positioned at an optimized distance from the edge of the device for usability. The display of the user interface option 610 and/or the user interface option 612 may be modified as depicted in FIG. 7. For example, the user interface option 310 may feature a magnifying class icon with a minus sign. In response to selecting the user interface option 610, the enhanced selection area 702 may be displayed. Should the user select the user interface option 610 again (e.g., now labeled with a magnifying glass with a minus sign at 710), the enhanced selection area 702 may be removed and the user interface option 610 may again appear as depicted in FIG. 6. Accordingly, the user may utilize the user interface option 610 to toggle on and off the display of the enhanced selection area 702. User interface option 612 of FIG. 6 may be used in a similar manner to toggle on and off display of the enhanced selection area 704. In some embodiments, a single user interface option (e.g., a single button or other suitable selection mechanism) may be utilized to toggle on/off display of both enhanced selection areas depicted in FIG. 6. Although only two enhanced selection areas may be depicted in FIG. 7, it should be appreciated that any suitable number of enhanced selection areas may be provided, with corresponding user interface options or a shared user interface option controlling their respective display.

In some embodiments, each of the enhanced selection areas 702 and 704 may be overlaid over the user interface 700 as depicted in FIG. 7, or the enhanced selection areas 702 and/or 704 may be provided adjacent to a smaller version of the user interface 700. Although the enhanced selection areas appear to be similarly shaped and sized within FIG. 7, it is contemplated that enhanced selection areas may utilize different shape(s) and/or size(s), and in some cases may differ from one another. Within each of the enhanced selection areas 702 and 704, one or more (e.g., two) subset selection areas corresponding to subsets of strings 706 may be provided. As depicted, the enhanced selection area 702 may include subset selection area 712 (e.g., corresponding to 8 strings of the strings 706), and subset selection area 714 (e.g., also corresponding to 8 strings of the strings 706). The subset selection area 712 may include a greater, a fewer, or an equal number of strings as the subset selection area 714. The strings within the subset selection area 712 may be configured to correspond to the same strings within the subset selection area 714, or the subset selection areas may be configured to correspond to different subsets of strings 706. In some cases, the subset selection area 712 and the subset selection area 714 may share at least one common string that is associated with the same note/string of the strings 706. By way of example only, string 716 and string 718 may correspond to the same note/string. In some examples, string 716, string 718, and string 708 may correspond to the same string of the virtual instrument.

In some embodiments, the enhanced selection area 704 may include subset selection area 720 (e.g., corresponding to 8 strings of the strings 706), and subset selection area 728 (e.g., also corresponding to 8 strings of the strings 706). The subset selection area 720 may include a greater, a fewer, or an equal number of strings as the subset selection area 722. The subset selection areas 720 and/or 722 may include a greater, a fewer, or an equal number of strings as the subset selection areas 712 and/or 714. The strings within the subset selection area 720 may be configured to correspond to the same strings within the subset selection area 722, or the subset selection areas may be configured to correspond to different subsets of strings 706. The strings within the subset selection areas 720/722 may be configured to correspond to the same strings within the subset selection areas 712/714, or the subset selection areas may be configured to correspond to different subsets of strings 706. In some cases, the subset selection area 720 and the subset selection area 722 may share at least one common string that is associated with the same note/string of the strings 706. By way of example only, string 724 and string 726 may correspond to the same note/string. In some examples, string 724, string 726, and string 708 may correspond to the same string of the virtual instrument. In still further examples, strings 716, 718, 724, and/or 726 (or any suitable combination of the above) may correspond to string 708.

The number of strings provided within the subset selection area(s) (712, 714, 720, and/or 722) may have a greater, a fewer, or an equal number of strings as the strings 706 (e.g., 13 as depicted, 17, etc.) and, in some cases, the number of strings may differ between subset selection areas. The distance between the strings within subset selection area 712 (indicated by spacing distance 728) and/or the distance between the strings within subset selection area 714 (indicated by spacing distance 730) may be larger (e.g., indicating wider spacing) than the spacing distance between strings 706. Similarly, the subset selection areas 720 and 722 may have different corresponding spacing distances than the spacing distance between strings 702, and/or the spacing distance 728, and/or the spacing distance 730. The intervallic distances between the respective strings of the subset selection areas 712, 714, 720, and/or 722 may include the same intervallic distances between strings 706, or the intervallic distances may differ. Said another way, while the notes of the strings 706 may vary by a half-step musical interval from one string to another (or according to a predetermined interval pattern associated with the musical scale selected), the notes corresponding to the strings of a subset selection area may vary by a different interval (e.g., a whole step, a step and a half, etc.) or a different predetermined interval pattern. In a similar manner, the intervallic distances between strings of one subset selection area (e.g., subset selection area 712) may vary from the intervallic distances of the strings 706 and/or the intervallic distance of strings of another subset selection area (e.g., subset selection area 714).

In some embodiments, the number of strings provided within the subset selection area(s) of the enhanced selection area 702 and/or the subset selection areas of the enhanced selection area 704 may vary between devices based at least in part on a capability of the device display. For example, the enhanced selection areas 702 and 704, as depicted, may be utilized on a smartphone, a wearable device, or any suitable device having a display size under a threshold amount.

Input may be received at the user interface 700 utilizing the strings 706 and/or any of the subset selection areas depicted in FIG. 7. By way of example, and string selection or playing technique (e.g., plucking/picking a string, a glissando, picking a string while adding tremolo, etc.) may be input using the any of the strings 706 and/or any strings associated with a subset selection areas 712, 714, 720, and/or 722. The user interface 700 may provide feedback via any suitable corresponding string according to an input received. For example, a user may utilize a touch screen on a device to tap on the location of the display corresponding to the string 708. In some examples, the string 708 may correspond to the string 716, the string 718, the string 724, and the string 726. Upon tapping the string, visual feedback may be provided at the string 708, the string 716, the string 718, the string 724, and the string 726 depicting a vibration at each string that corresponds to the string 708. Similarly, were the user to select any of the corresponding strings within a subset selection area (e.g., string 716, string 718, string 724, or string 726), visual feedback may be provided at corresponding strings (including the string 708). Accordingly, any visual feedback provided at one location, may be similarly provided at other locations within the user interface 700 that correspond to the same note/string.

By utilizing the enhanced selection area 702 and/or the enhanced selection area 704, the user can more accurately select a particular string(s) then by using the user interface 600 of FIG. 6 alone. The enhanced selection areas 702 and 704 may provide subset selection area(s) and wider spacing between strings, reducing the risk of unintended inputs by the user. Additionally, the user may be visually informed of relationships between the strings 706 and strings ultimately contained within the enhanced selection area 702 and/or the enhanced selection area 704. As discussed, the user may be informed of such relationships given the visual feedback (corresponding to the input) that is provided at any corresponding string (regardless of the particular location utilized to provide such input). By being informed of such relationships the user is provided multiple locations from which input may be provided, enabling the user to provide complex inputs with ease.

Figure 8:
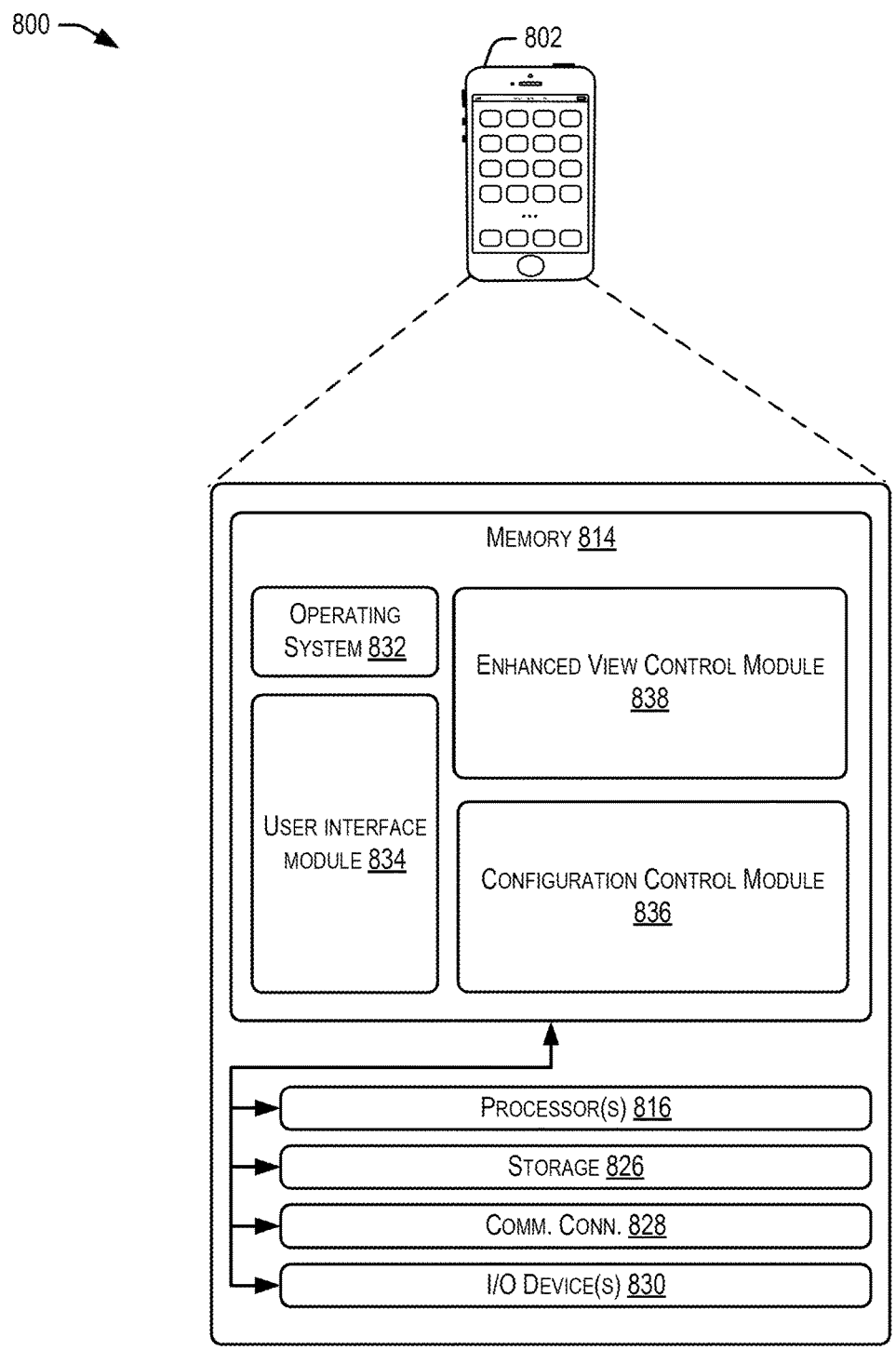
FIG. 8 is a simplified block diagram illustrating an example architecture for implementing a user interface and user interface elements for interacting with a virtual instrument as described herein, according to at least one embodiment.

FIG. 8 is a simplified block diagram illustrating an example architecture 800 for implementing a user interface and user interface elements for interacting with a virtual instrument as described herein, according to at least one embodiment. In some examples, a computing device 802 of the example architecture 800 may be configured to present a user interface (e.g., user interfaces 100-700, and the like). The user interface may include any suitable number and configuration of the user interface elements described in the figure descriptions above.

The computing device 802 may be configured to execute or otherwise manage applications or instructions for presenting user interfaces/interface elements such as, but not limited to, a user interface for playing one or more virtual instruments. The computing device 802 may collect receive inputs (e.g., utilizing the I/O device(s) 830 such as a touch screen) from a user at the user interface, determine which audio samples to play in order to simulate playing the instrument, and then present audio output corresponding to the audio samples utilizing the I/O device(s) 830 (e.g., a speaker of the computing device 802). The computing device 802 may further receive input from one or more user interface elements such as the ones described above in connection with figures described above. The computing device 802 may be configured to determine other appropriate audio samples and/or modify current audio output in accordance with input received from one or more user interface elements.

The computing device 802 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the computing device 802 may include at least one memory 814 and one or more processing units (or processor(s)) 816. The processor(s) 816 may be implemented as appropriate in hardware, computer-executable instructions, or combinations thereof. Computer-executable instruction or firmware implementations of the processor(s) 816 may include computer-executable or machine-executable instructions written in any suitable programming language to perform the various functions described.

The memory 814 may store program instructions that are loadable and executable on the processor(s) 816, as well as data generated during the execution of these programs. Depending on the configuration and type of the computing device 802, the memory 814 may be volatile (such as random access memory (RAM)) and/or non-volatile (such as read-only memory (ROM), flash memory, etc.). The computing device 802 may also include additional removable storage and/or non-removable storage 826 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 814 and the additional storage 826, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 814 and the additional storage 826 are both examples of non-transitory computer storage media. Additional types of computer storage media that may be present in the computing device 802 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the computing device 802. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 802 may also contain communications connection(s) 828 that allow the computing device 802 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The computing device 802 may also include I/O device(s) 830, such as a touch input device, a keyboard, a mouse, a pen, a voice input device, a display, a speaker, a printer, etc.

Turning to the contents of the memory 814 in more detail, the memory 814 may include an operating system 832 and/or one or more application programs or services for implementing the features disclosed herein including a user interface module 834, a configuration control module 836, and an enhanced view control module 838. The memory 814 may also be configured to store one or more audio samples to be used to produce audio output. In this way, the computing device 802 can perform all of the operations described herein, including implementing an entire virtual instrument application, without connection to any other computing devices or networks. For example, the virtual instrument application can be executed locally with locally stored samples.

In some examples, the user interface module 834 may be configured to manage the user interface of the computing device 802. For example, the user interface module 834 may present the user interfaces 100, 200, 300, 400, 500, 600, 700, or any suitable user interface for interacting with a virtual instrument. Further, the user interface module 834 may be configured to present one or more user interface elements (e.g., scale selection options, a chords option, a notes option, a tremolo user interface element, one or more enhanced selection areas, or the like) for simulating or otherwise playing the virtual instruments in the manner described above. Additionally, in some examples, the user interface module 934 may be configured to receive and process user input, user interface element selections, pitch bend information, and/or gesture information (e.g., via touch screen) for interacting with the virtual instruments. For example, a user may tap a virtual string of a virtual instrument to cause the computing device 802 to provide audio output corresponding to a note on a speaker of the computing device 802.

In some embodiments, the user interface module 834 may be configured to receive input corresponding to a pitch bend request. The pitch bend request may include a selected string location, a distance or angle the selected string has been dragged, and/or a tilt angle of the computing device 802. Upon receiving the pitch bend request, the user interface module 834 may be configured to determine an amount to modify the pitch of audio output provided. In some examples, the distance (and direction) dragged along a string may be utilized to determine the pitch modification. By way of example, a maximum bend value (e.g., a maximum frequency change value) may be predetermined and stored in memory 814. The user interface module 834 may be configured to determine a pitch change value based at least in part on the distance/direction the input was dragged along a string. In some examples, if the distance dragged exceeds a threshold distance, the maximum frequency change value may be utilized. Whereas, if the distance does not exceed the threshold, the pitch may be modified as a function of the distance (and direction) dragged. Accordingly, the user interface module 834 may be configured to modify the pitch of the audio output provided based at least in part on the pitch bend request received.

In some examples, the user interface module 834 may be configured to provide and receive a request utilizing input received at a scale selection option (e.g., the scale selection options 108, 206, 510, and 606 of FIGS. 1, 2, 5, and 6, respectively). Upon receipt of the request, the user interface module 834 may be configured to provide a number of scale selection options on the display of the computing device 802 such as a popup window, a menu, or other suitable selection element. The user interface module 834 may be configured to receive a selection of a musical scale. Upon receipt, the user interface module 834 may request a corresponding configuration from the configuration control module 836 discussed further below. Upon receiving a new configuration from the configuration control module 836, the user interface module 834 may reconfigure the user interface to correspond to the musical scale selected. Reconfiguring the user interface may include providing a number of strings corresponding to a number of string locations that are associated with particular musical notes associated with the scale. In some examples, reconfiguration of the user interface may be in accordance with a predetermined configuration that is associated with the scale.

In at least one embodiment, the user interface module 834 may be to provide a chords view or a notes view of the user interface as well as corresponding view options. The user interface module 834 may be configured to reconfigure the user interface to correspond to the view selected. For example, the user interface module 834 may be configured to provide the user interface 100 of FIG. 1 for a Guzheng virtual instrument or a user interface 500 of FIG. 5 for a Koto virtual interface when a selection of "notes" view is received.

In some examples, the user interface module 834 may be configured to provide and receive input received at or related to a tremolo user interface element. For example, the user interface module 834 may receive input at a tremolo user interface element, and/or the user interface module 834 may receive changes to the selection via the tremolo user interface element and/or at a location corresponding to a string of the virtual instrument. According to such input, the user interface module 834 may be configured to provide audio output. The audio output provided may correspond to a previously-recorded audio sample, or in some cases, the audio output may be a modified version of the previously-recorded audio sample.

In at least one embodiment, the user interface module 834 may be configured to select a suitable audio sample with which to provide audio output. In some examples, the audio sample may correspond to an audio sample currently being used to provide audio output. That is, an audio sample corresponding to a simulated note currently being presented on a speaker of the computing device 802 may be selected by the user interface module 834. In at least one example, the user interface module 834 may be configured to select (or generate) a set of audio samples with which to provide audio output. The set of audio samples may include one or more audio samples that may differ from an audio sample for providing audio output that is not related to a variation control interface element selection. For example, the set of audio samples may include audio samples that differ slightly in pitch and/or volume as an audio sample used to provide audio output corresponding to a note selection. Once selected, the user interface module 834 may utilized the set of audio samples to provide audio output including a simulation of playing repeated notes according to a picking technique on a speaker of the computing device 802. The speed and/or volume of the picking technique simulation may be in accordance with the speed determined from the pressure location input received.

In addition to audio output, the user interface module 834 may be configured to provide visual feedback corresponding to input received. For example, the user may tap on a location corresponding to a string. The user interface module 834 may provide visual feedback (e.g., depicting string vibration or a suitable movement of the string) at the input location. In at least one embodiment, the user interface module 834 may determine a number of related strings (e.g., strings provided as part of a user interface and/or an enhanced selection area) that correspond to the string selected. Once determined, the user interface module 834 may provide similar visual feedback at locations associated with the related strings.

The user interface module 834 may be configured to provide and receive input from one or more enhanced selection areas (e.g., enhanced selection areas 114, 116, 402,

404, 702, and 704, of FIGS. 1, 4, and 7) and/or subset selection areas (e.g., subset selection areas 410, 412, 422, 424, 712, 714, 720, and 722, of FIGS. 4 and 7). The particular configuration of an enhanced selection area (and/or subset selection area) may be ascertained from a previously-stored configuration managed by the configuration control module 836. The user interface module 834 may be configured to obtain a configuration for one or more enhanced selection areas (including any suitable number of subset selection areas) and provide the enhanced selection area(s) according to the configuration. Transition animations that specify how an enhanced selection area may visually be transitioned onto a user interface may additionally be specified as part of a configuration for the user interface and/or enhanced selection area involved in a selection. Alternatively, the user interface module 834 may determine an optimized distance from an edge of the display and may cause a displayed enhanced selection area to be visually transitioned to that location for usability.

The configuration control module 836 may be configured to determine a configuration of a user interface to be provided by the user interface module 834. In some embodiments, the configuration control module 836 can retrieve or obtain device capabilities information that specifies a device identifier, a device type, and/or one or more device capabilities (e.g., a display size, a display shape, a display resolution, a processing resource, or the like). The device capabilities may be obtained in any suitable manner. For example, the configuration control module 836 may access memory 814 where a device identifier and/or device type may be stored. In some examples, the configuration control module 836 may utilize a device identifier/type to lookup a previously stored configuration associated with the device identifier/type and a virtual instrument. Many predetermined configuration may be stored in memory 814. Each configuration may correspond to a particular device or device type, particular device capabilities (e.g., a display size/shape/resolution, etc.), a particular virtual instrument (e.g., a Guzheng, a Koto, etc.), a particular musical scale, one or more enhanced selection areas, one or more subset selection areas, and the like. The configuration control module 836 may be configured to provide the configuration to the user interface module 834 such that the user interface module 834 is enabled to modify the provided user interface according to the provided configuration.

The enhanced view control module 838 may be configured to determine a configuration of an enhanced selection area, and/or a subset selection area to be provided by the user interface module 834. In some embodiments, the enhanced view control module 838 can retrieve or obtain device capabilities information that specifies a device identifier, a device type, and/or one or more device capabilities (e.g., a display size, a display shape, a display resolution, a processing resource, or the like). The device capabilities may be obtained in any suitable manner. For example, the enhanced view control module 838 may access memory 814 where a device identifier and/or device type may be stored. In some examples, the enhanced view control module 838 may utilize a device identifier/type to lookup a previously stored configuration associated with the device identifier/type and a virtual instrument. Many predetermined configuration may be stored in memory 814. Each configuration may correspond to a particular device or device type, particular device capabilities (e.g., a display size/shape/resolution, etc.), a particular virtual instrument (e.g., a Guzheng, a Koto, etc.), a particular musical scale, one or more enhanced selection areas, one or more subset selection areas, and the like. The enhanced view control module 838 may be configured to provide the configuration of one or more enhanced selection areas and/or one or more subset selection areas to the user interface module 834 such that the user interface module 834 is enabled to provide such areas at the user interface (e.g., overlaid upon the user interface).

While many embodiments are described herein in connection to stringed instruments such as a Guzheng and a Koto, the features described herein can be used to implement any virtual instrument imaginable.

Figure 9:
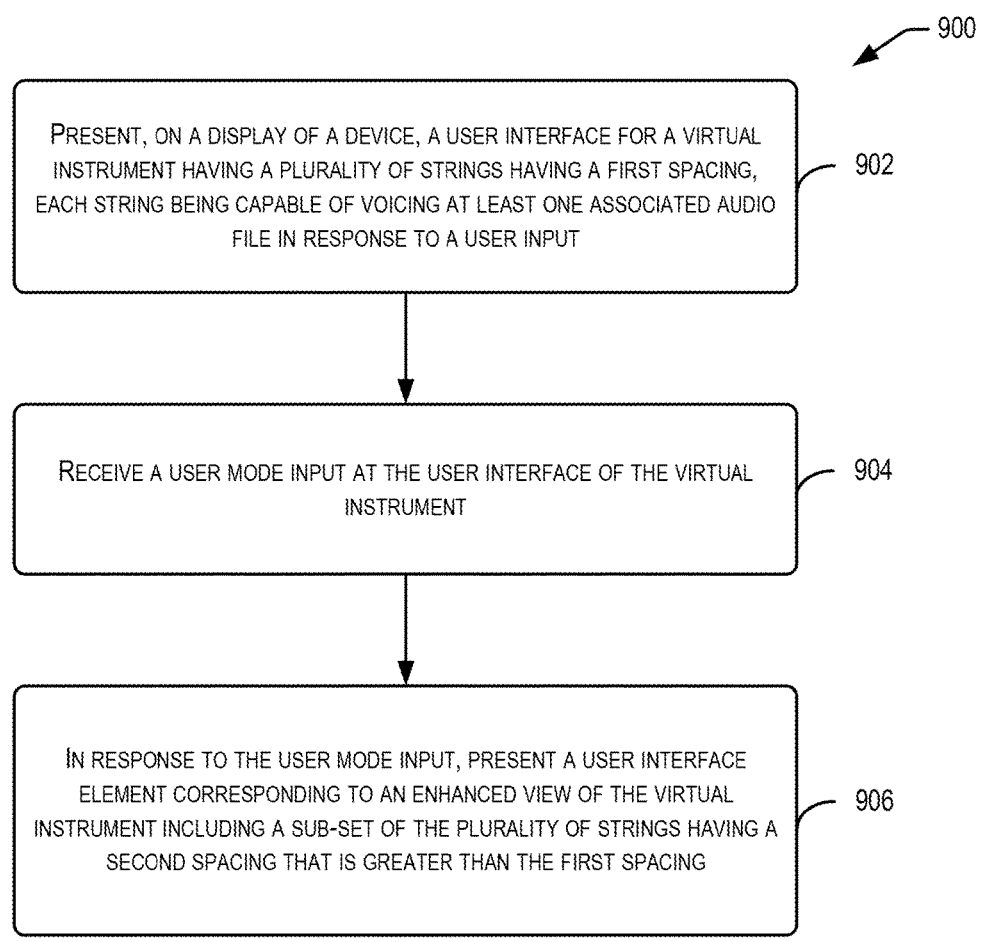
FIG. 9 is a simplified flow diagram illustrating an example process for implementing a user interface including one or more user interface elements for a virtual instrument as described herein, according to at least one example.
Figure 10:
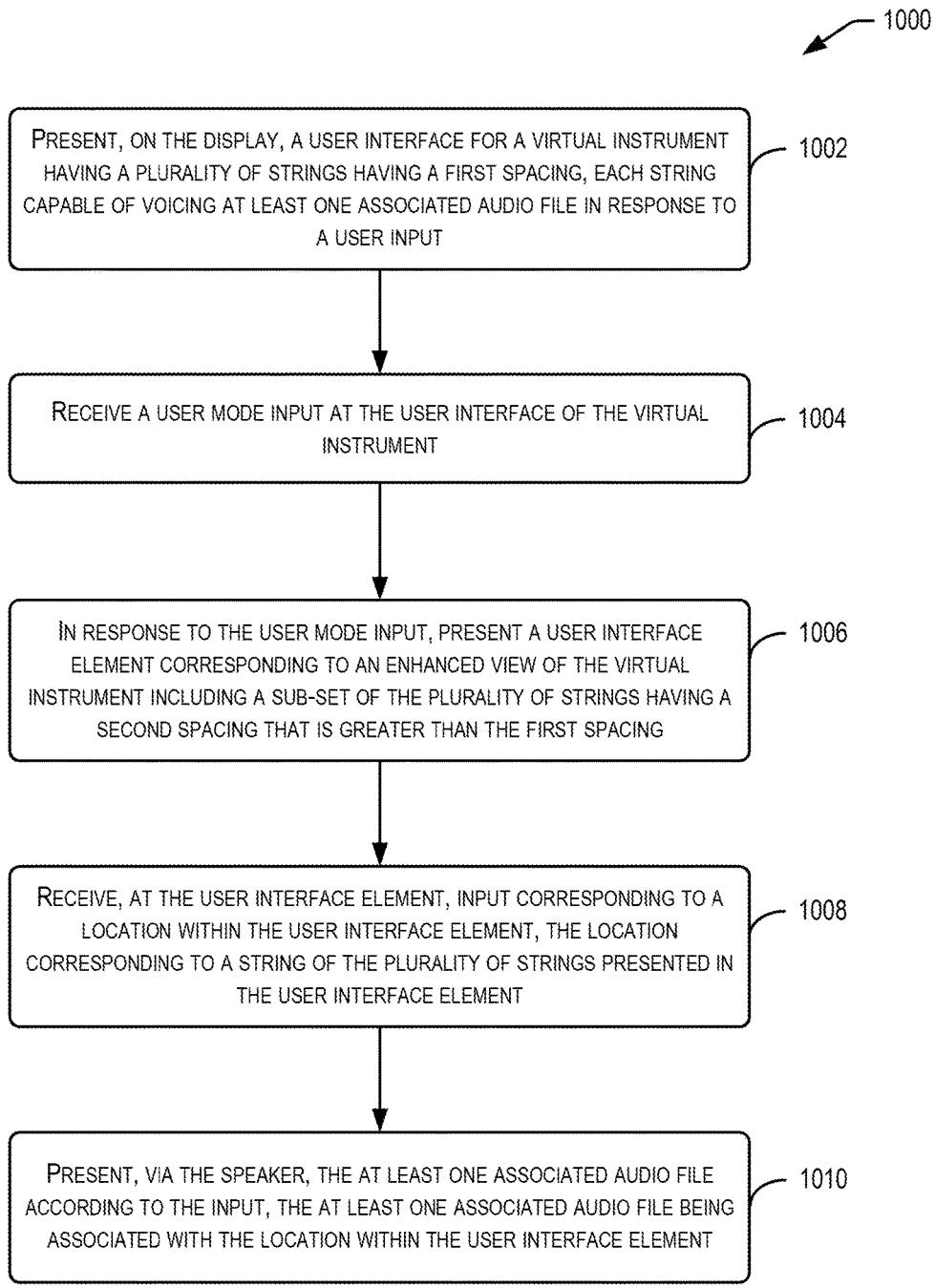
FIG. 10 is another simplified flow diagram illustrating another example process for implementing a user interface including one or more user interface elements for a virtual instrument as described herein, according to at least one example.

FIGS. 9 and 10 illustrate example flow diagrams showing respective processes 900 and 1000 for implementing a user interface and one or more user interface elements for a virtual instrument, as described herein. These processes 900 and 1000 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, the process 900 may be performed by the computing device 802 of FIG. 8 (e.g., utilizing at least the user interface module 834 and the configuration control module 836). In some examples, the computing device 802 may comprise a memory configured to store computer-executable instructions, a speaker, and a processor in communication with the memory and the speaker, the processor configured to execute the computer-executable instructions. The process 900 may begin at 902 where a user interface for a virtual instrument (e.g., a Guzheng, a Koto, etc.) is presented (e.g., by the user interface module 834 on a display of the computing device 802). In some example, the user interface presented may include a plurality of strings having a first spacing. Each string may correspond to at least one associated audio file.

At 904, a user mode input (e.g., corresponding to a selection of a user interface element associated with displaying an enhanced selection area) may be received at the user interface of the virtual instrument. For example, a user mode input may be received when the user select user interface element 114 of FIG. 1, or user interface element 610 of FIG. 6, or at any suitable user interface element corresponding to an enhanced selection area discussed above.

At 906, a user interface element (e.g., an enhanced selection area) may be presented (e.g., utilizing the user interface module 834 and the enhanced view control module 838 of FIG. 8) in response to the user mode input. In some examples, the user interface element may correspond to an enhanced view of the virtual instrument including a sub-set of the plurality of strings having a second spacing that is greater than the first spacing. By way of example, the user may select user interface element 610. In response to the selection, a user interface element (e.g., enhanced selection area 702) may be presented. Selecting the user interface element again (as depicted at 710 of FIG. 7) may remove the user interface element (e.g., enhanced selection area 702) from display.

Moving on to FIG. 10, the process 1000 may be performed by the computing device 802 of FIG. 8 (e.g., utilizing at least the user interface module 934 and any suitable combination of the configuration control module 836 and/or the enhanced view control module 838 shown in FIG. 8. The process 1000 may begin at 1002 where a user interface (e.g., a Guzheng, a Koto, etc.) is presented (e.g., by the user interface module 834) on a display of an electronic device (e.g., the computing device 902). In some example, the user interface may comprise a plurality of string having a first spacing. The number, type, configuration and spacing distance between the strings may be determined using a predetermined configuration (e.g., managed and accessed by the configuration control module 836). Each string may be associated with at least one audio file. Selection of a string may cause audio output corresponding to the location of the selected string.

At 1004, a user mode input (e.g., corresponding to a selection of a user interface element associated with displaying an enhanced selection area) may be received (e.g., by the user interface module 834) at the user interface of the virtual instrument. For example, a user mode input may be received when the user select user interface element 114 of FIG. 1, or user interface element 610 of FIG. 6, or at any suitable user interface element corresponding to an enhanced selection area discussed above.

At 1006, a user interface element (e.g., an enhanced selection area) may be presented (e.g., utilizing the user interface module 834 and the enhanced view control module 838 of FIG. 8) in response to the user mode input. In some examples, the user interface element may correspond to an enhanced view of the virtual instrument including a sub-set of the plurality of strings having a second spacing that is greater than the first spacing. By way of example, the user may select user interface element 610. In response to the selection, a user interface element (e.g., enhanced selection area 702) may be presented. Selecting the user interface element again (as depicted at 710 of FIG. 7) may remove the user interface element (e.g., enhanced selection area 702) from display.

At 1008, input corresponding to a location within the user interface element (e.g., an enhanced selection area provided by the user interface module 834) may be received at the user interface element. The location may correspond to a string of the plurality of strings (e.g., a string subset) presented in the user interface element. The input may be received by the user interface module 834. In at least one embodiment, the string location may correspond to a particular note frequency of a plurality of note frequencies that are playable by the virtual instrument. In some embodiments, the string location may correspond to a note of a musical scale currently associated with the user interface and user interface element. The musical scale may be associated by default or user selection (e.g., based at least in part on input received at a scale selection option accessible from the user interface).

At 1010, at least one associated audio file may be presented (e.g., by the user interface module 934) via a speaker (e.g., a speaker of the computing device 802) according to the input received at 1008. In at least one example, the audio output may comprise a note corresponding to the string location. According to some embodiments, the audio output may be selected (by the user interface module 834 based at least in part on the string location) from a plurality of stored audio samples corresponding to a plurality of musical notes that are playable by the virtual instrument. Such audio samples may be prerecorded and may individually present a sound as played on a physical instrument associated with the virtual instrument. In some embodiments, visual feedback may also be provided at the location of the string corresponding to the user input received at 1008. In still further embodiments, the user interface module 834 may provide visual feedback at any suitable string associated with the same musical note as the string selected with which the input received at 1008 relates.

Figure 11:
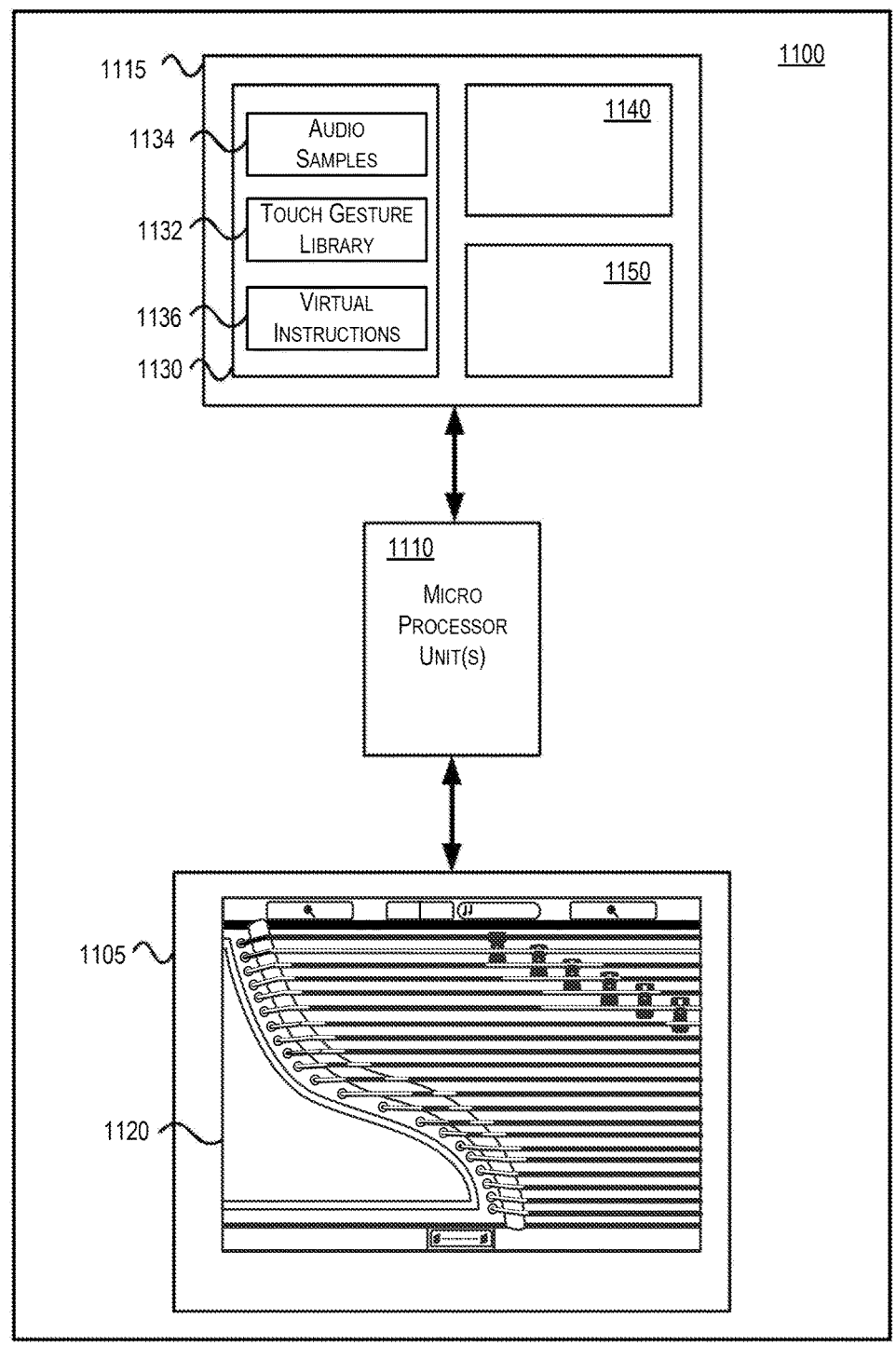
FIG. 11 is a simplified block diagram illustrating an example of a musical performance system that can enable a user to compose and create music with a number of virtual instruments on a music application as described herein, according to at least one example.

FIG. 11 illustrates an example of a musical performance system that can enable a user to compose and create music with a number of virtual instruments on a music application, according to an embodiment of the disclosure. Musical performance system 1100 can include multiple subsystems such as a display 1105, one or more processing units 1110, and a storage subsystem 1115. One or more communication paths can be provided to enable one or more of the subsystems to communicate with and exchange data with one another. The various subsystems in FIG. 11 can be implemented in software, in hardware, or combinations thereof. In some embodiments, the software can be stored on a transitory or non-transitory computer readable storage medium and can be executed by one or more processing units.

It should be appreciated that musical performance system 1100 as shown in FIG. 11 can include more or fewer components than those shown in FIG. 11, can combine two or more components, or can have a different configuration or arrangement of components. In some embodiments, musical performance system 1100 can be a part of a portable computing device, such as a tablet computer, a mobile telephone, a smart phone, a desktop computer, a laptop computer, a kiosk, etc.

Display 1105 in some embodiments can provide an interface that allows a user to interact with musical performance system 1100. Display 1105 can be a monitor or a screen in some embodiments. Through the interface, the user can view and interact with a GUI 1120 of a musical performance system 1100. In some embodiments, display 1105 can include a touch-sensitive interface (also sometimes referred to as a touch screen) that can both display information to the user and receive inputs from the user. Processing unit(s) 1110 can include one or more processors that each have one or more cores. In some embodiments, processing unites) 1110 can execute instructions stored in storage subsystem 1115. System 1100 may also include other types of user input and output mechanisms such as allowing a user to provide an input based at least in part on received accelerometer or gyroscope sensor readings (internal to system 1200) or provide output such as haptic output based at least in part on a desired musical characteristic.

Storage subsystem 1115 can include various memory units such as a system memory 1130, a read-only memory (ROM) 1140, and a permanent storage device 1150. The system memory can be a read-and-write memory device or a volatile read-and-write memory, such as dynamic random access memory. The system memory can store some or all of the instructions and data that the processor needs at runtime. The ROM can store static data and instructions that are needed by processing unites) 1110 and other modules of system 1100. The permanent storage device can be a read-and-write memory device. Some embodiments of the disclosure can use a mass-storage device (such as a magnetic or optical disk or flash memory) as a permanent storage device. Other embodiments can use a removable storage device (e.g., a floppy disk, a flash drive) as a permanent storage device.

Storage subsystem 1115 can store a touch gesture library that includes a number of system recognizable touch gestures 1132 on the GUI 1120, MIDI-controlled audio samples 1134 for storing data relating to music played on the virtual instruments, and virtual instrument data 1136 for storing information about each virtual instrument. Further detail regarding system architecture and auxiliary components thereof are not discussed in detail so as not to obfuscate the focus on the disclosure and would be understood by those of ordinary skill in the art.

What is claimed is:

1. A method, comprising:
presenting, on a display of an electronic device, a user interface for a virtual instrument having a plurality of strings having a first spacing, each string being capable of voicing at least one associated audio file in response to a user input;
receiving a user mode input at the user interface of the virtual instrument; and
in response to the user mode input, presenting a user interface element corresponding to an enhanced view of the virtual instrument, the enhanced view including a subset of the plurality of strings having a second spacing that is greater than the first spacing, the subset of the plurality of strings of the enhanced view being capable of voicing associated audio files in response to input provided at the enhanced view.

2. The method of claim 1, wherein the display has a touch screen interface for receiving the user mode input.

3. The method of claim 1, wherein presenting the user interface element comprises visually transitioning the user interface element as an overlay upon the user interface of the virtual instrument.

4. The method of claim 3, wherein visually transitioning corresponds to visually sliding the user interface element from an edge of the display to an overlaid position upon the user interface of the virtual interface.

5. The method of claim 3, wherein visually transitioning corresponds to visually sliding the user interface element to reside adjacent to a device edge whereby the subset of the plurality of strings are positioned at a distance from the device edge.

6. The method of claim 1, further comprising:
receiving, at the user interface element, input corresponding to a location within the user interface element, the location corresponding to a string of the subset of the plurality of strings presented in the user interface element;
providing, at the user interface and at the user interface element, visual feedback representing the input; and
presenting, via an output device of the electronic device, the at least one associated audio file in accordance with the input, the at least one associated audio file being associated with the string.

7. The method of claim 1, wherein the user interface element comprises two separate user interface element portions.

8. The method of claim 1, further comprising:
receiving an additional user mode input at the user interface of the virtual instrument; and
in response to the additional user mode input, presenting, at the user interface of the electronic device, an additional user interface element, the additional user interface element representing an additional enhanced view portion of the user interface, the additional enhanced view portion corresponding to a different subset of the plurality of strings having the second spacing greater than the first spacing;
receiving, at the additional user interface element of the electronic device, input corresponding to a location within the additional user interface element;
providing visual feedback representing the input at the user interface, at the user interface element, and at the additional user interface element; and
presenting, via a speaker of the electronic device, a corresponding audio file in accordance with the input, the corresponding audio file being associated with the location within the additional user interface element.

9. A device, comprising:
a memory configured to store computer-executable instructions;
a display;
a speaker; and
a processor in communication with the memory, the display, and the speaker, the processor configured to execute the computer-executable instructions to at least:
present, on the display, a user interface for a virtual instrument having a plurality of strings having a first spacing, each string being capable of voicing at least one associated audio file in response to a user input;
receive a user mode input at the user interface of the virtual instrument;
in response to the user mode input, present a user interface element corresponding to an enhanced view of the virtual instrument, the enhanced view including a subset of the plurality of strings having a second spacing that is greater than the first spacing, the subset of the plurality of strings of the enhanced view being capable of voicing associated audio files in response to user input provided at the enhanced view;
receive, at the user interface element, input corresponding to a location within the user interface element, the location corresponding to a string of the plurality of strings presented in the user interface element; and
present, via the speaker, the at least one associated audio file according to the input, the at least one associated audio file being associated with the location within the user interface element.

10. The device of claim 9, wherein the processor is further configured to execute the computer-executable instructions to at least:
provide, at the user interface and the user interface element, visual feedback representing the input.

11. The device of claim 9, wherein the input corresponding to the location within the user interface element is received from a touch screen interface for receiving the input.

12. The device of claim 9, wherein the user interface element is overlaid on the user interface.

13. The device of claim 9, wherein the user interface presents a first configuration of the plurality of strings associated with the virtual instrument, the first configuration being based at least in part on capabilities of the display.

14. The device of claim 9, wherein the processor is further configured to execute the computer-executable instructions to at least:
  receive an additional user mode input at the user interface of the virtual instrument; and
  present, at the display, an additional user interface element, the additional user interface element being separate from the user interface element, the additional user interface element representing a different subset of the plurality of strings.

15. The device of claim 14, wherein the user interface element presents a first configuration of strings associated with the subset of the plurality of strings presented in the user interface element and the additional user interface element presents a second configuration of strings associated with the different subset of the plurality of strings presented in the additional user interface element.

16. A computer-readable storage medium having stored thereon computer-executable instructions that, when executed by a processor, cause the processor to perform operations comprising:
  presenting, via a display, a user interface for a virtual instrument having a plurality of strings having a first spacing, each string being capable of voicing at least one associated audio file in response to a user input;
  receiving a user mode input at the user interface of the virtual instrument;
  in response to the user mode input, presenting a user interface element corresponding to an enhanced view of the virtual instrument, the enhanced view including a subset of the plurality of strings having a second spacing that is greater than the first spacing, the subset of the plurality of strings of the enhanced view being capable of voicing associated audio files in response to input provided at the enhanced view.

17. The computer-readable storage medium of claim 16, having stored thereon additional computer-executable instructions that, when executed by a processor, cause the processor to perform operations comprising:
  receiving, via the user interface, a musical scale selection; and
  determining a configuration for the plurality of strings presented in the user interface, the configuration being determined based at least in part on the musical scale selection.

18. The computer-readable storage medium of claim 17, having stored thereon additional computer-executable instructions that, when executed by a processor, cause the processor to perform operations comprising:
  determining a different configuration of the subset of the plurality of strings presented in the user interface element, the different configuration being determined based at least in part on the musical scale selection.

19. The computer-readable storage medium of claim 16, having stored thereon additional computer-executable instructions that, when executed by a processor, cause the processor to perform operations comprising:
  receiving, at the user interface, input corresponding to a string of the plurality of strings, wherein the input received at the user interface causes first visual feedback to be provided at the user interface at a substantially a same time as second visual feedback is provided at the user interface element.

20. The computer-readable storage medium of claim 19, wherein the first visual feedback is provided at a first location of the user interface, and wherein the second visual feedback is provided at a second location of the user interface element, the first location and the second location being associated with a particular string of the virtual instrument.

* * * * *